United States Patent [19]
Steenackers et al.

[11] Patent Number: 5,645,803
[45] Date of Patent: Jul. 8, 1997

[54] CATALYST MEANS FOR THE CATALYTIC TREATMENT OF EXHAUST GAS CATALYTIC CONVERTER

[75] Inventors: Pieter D. Steenackers, Heverlee; J. W. Jörg Alexnat, Vliermaal, both of Belgium

[73] Assignee: Scambia Industrial Developments Aktiengesellschaft, Schaan, Liechtenstein

[21] Appl. No.: 420,176

[22] Filed: Apr. 11, 1995

[30] Foreign Application Priority Data

Apr. 11, 1994 [CH] Switzerland ................ 1064/94

[51] Int. Cl.⁶ .................................................. B01D 50/00
[52] U.S. Cl. .................... 422/177; 422/171; 422/180; 502/439; 502/527
[58] Field of Search ....................... 422/171, 177, 422/178, 179, 180, 181; 502/439, 527; 428/594, 636

[56] References Cited

U.S. PATENT DOCUMENTS

| 3,713,281 | 1/1973 | Asker et al. | 96/154 |
|---|---|---|---|
| 4,248,297 | 2/1981 | Pei | 165/166 |
| 5,294,411 | 3/1994 | Breuer et al. | 422/174 |
| 5,336,472 | 8/1994 | Toyada et al. | 422/177 |
| 5,342,588 | 8/1994 | Humpolik | 422/311 |
| 5,395,599 | 3/1995 | Koshiba et al. | 422/180 |
| 5,480,621 | 1/1996 | Breuer et al. | 422/174 |
| 5,486,338 | 1/1996 | Ota et al. | 422/179 |
| 5,502,023 | 3/1996 | Humpolik et al. | 29/890 |

FOREIGN PATENT DOCUMENTS

| 0336721 | 4/1989 | European Pat. Off. |
|---|---|---|
| 2617903 | 7/1987 | France. |
| 3817492 | 5/1988 | Germany. |
| 0514326 | 4/1992 | Germany. |
| 8100042 | 9/1981 | Japan. |
| 21431 | 10/1993 | Sweden. |
| 2062487 | 11/1980 | United Kingdom. |

OTHER PUBLICATIONS

Article from Engineering (1993) Nov. No. 10, London, "Catalytic Converters, Engineering", v. 223, pp. 7, 9.

*Primary Examiner*—Christopher Kim
*Attorney, Agent, or Firm*—Anderson Kill & Olick P.C.

[57] ABSTRACT

The catalyst means for the catalytic treatment of exhaust gas have at least one catalyst support with a packet of alternating first and second sheet metal members. Each first sheet metal member has a main section with a number of protuberances, for example waves. The second sheet metal members have a main section resting against the wave summits of at least one adjacent, first sheet metal member. Coatings comprising an alumina layer and catalytically active material are applied to the main sections which together bound passages for the exhaust gas. Each sheet metal member is connected in at least one retaining section rigidly to a member of retaining means and/or is held by said member a distance away from a retaining section of another sheet metal member. This makes it possible to connect the sheet metal members to one another in a stable and permanent manner without them being damaged by excessive compressive forces and/or movements.

40 Claims, 10 Drawing Sheets

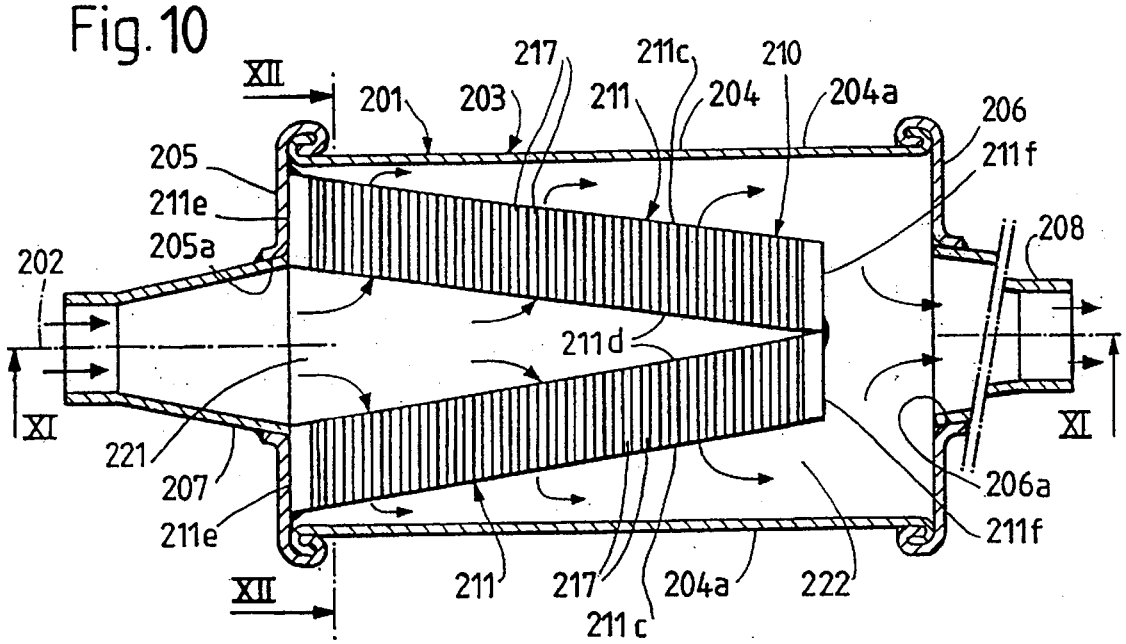
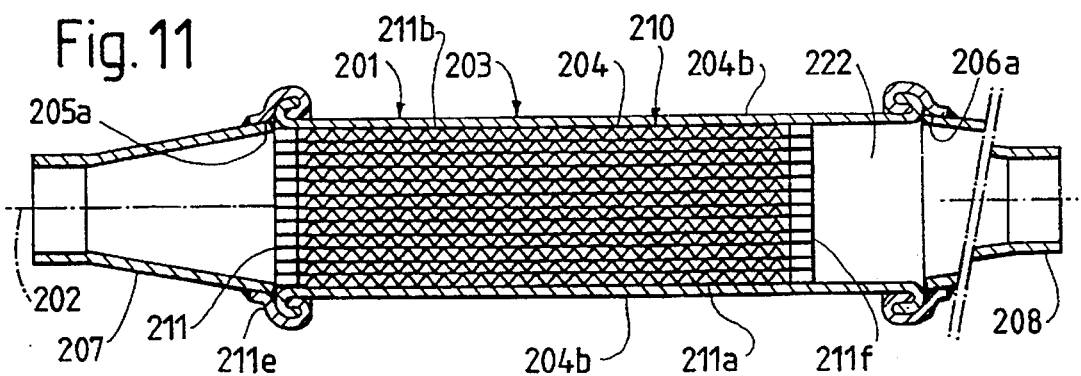
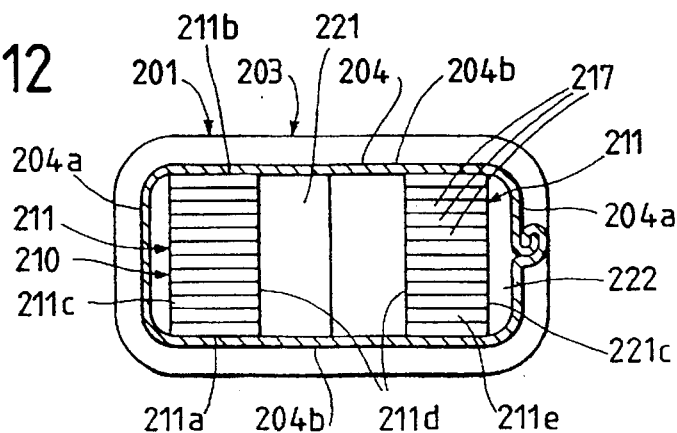

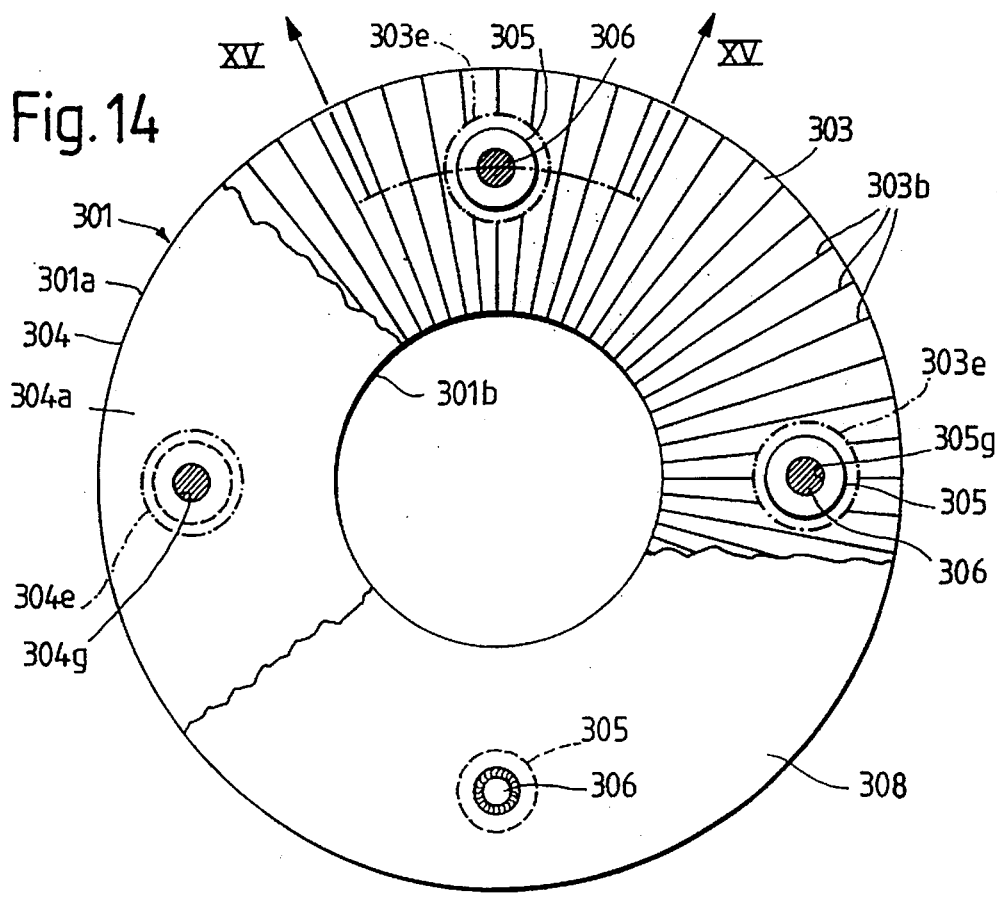
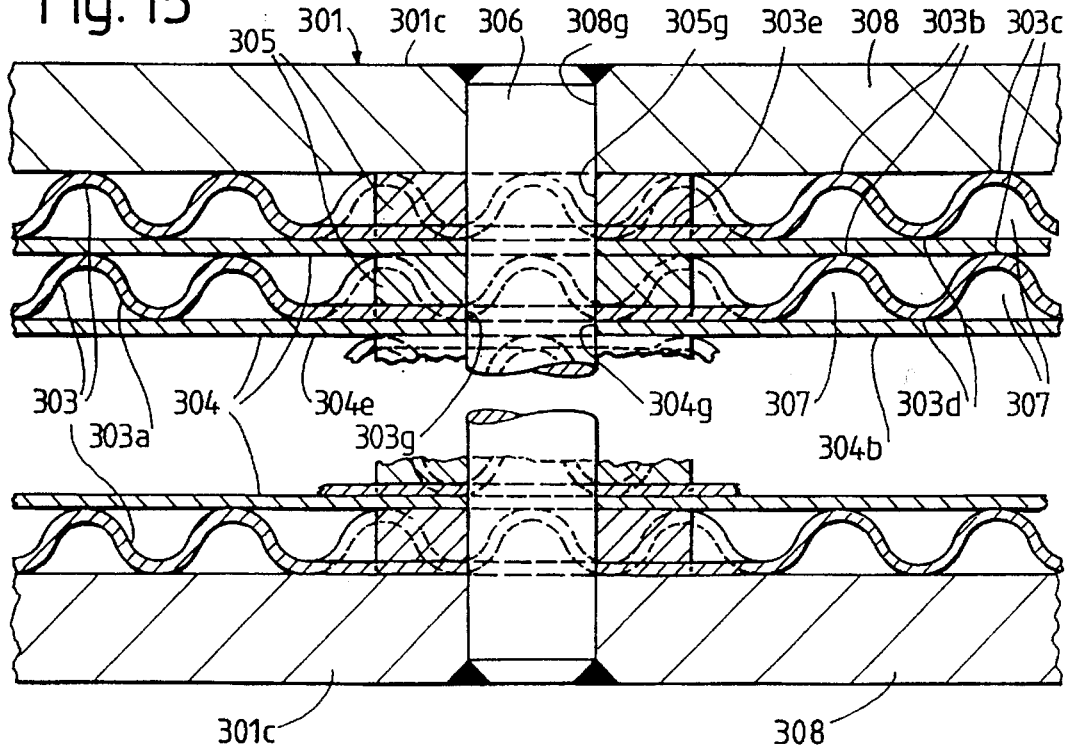

CATALYST MEANS FOR THE CATALYTIC TREATMENT OF EXHAUST GAS CATALYTIC CONVERTER

BACKGROUND OF THE INVENTION

1. Field of the Invention

The invention relates to catalyst means for the catalytic treatment of exhaust gas. Such catalyst means intended for installation in a housing of a catalytic converter are frequently also referred to as the substrate of the catalytic converter.

The catalyst means have passages for the exhaust gas and are intended in particular for purifying and/or detoxifying exhaust gas produced by a petrol combustion engine or possibly by other internal combustion engine and flowing through the passages by a catalytic treatment, i.e. for freeing said exhaust gas from pollutants, by converting the latter chemical reaction. The internal combustion engine may belong, for example, to an automobile or to another motor vehicle or serve for stationary operation—for example for driving an emergency power generator.

2. Description of the Prior Art

Known catalyst means or substrates have a packet of sheet metal members which rest against one another at certain points and together bound passages. Said sheet metal members are provided with coatings which contain alumina and catalytically active material which is applied to the alumina and consists of at least one noble metal. The sheet metal members are held together by retaining means.

European Patent Disclosure 0 514 326 discloses inter alia, for exude, catalyst means having disk-like sheet metal members. The successive sheet metal members have intersecting waves, are arranged between flat end members and are held together by these and by bolts which pass through them, one of the end members being formed by a housing wall.

When a catalytic converter is installed in an automobile, vibrations, accelerations and hard, abrupt impacts acting on the catalyst means during the use of the automobile are produced. In addition, the catalyst means are heated by the exhaust gas during operation and then cooled again, local temperature differences being produced and the dimensions of the various parts changing as a function of the local temperature. In known catalyst means of the type described, the vibrations, accelerations, impacts and thermally produced dimensional changes result in the sheet metal members moving along the bolts and the compressive forces exerted by the sheet metal members and end members on one another changing as a function of time and place. Very large and, in some cases, abrupt changing compressive forces may occur temporarily from place to place and cause the alumina and the catalytically active material to split off.

In order to obtain a large number of passages per unit area and to keep the weight, the heat capacity and the material costs low, it is desirable to produce the catalyst means from sheet metal members which are as thin as possible. However, during use of a catalytic converter, forces which are also directed transversely to the bolts are exerted at the edges of the holes in the sheet metal members through which the bolts pass and may damage the stated edges, in particular in the case of thin sheet metal members. In addition, movements of the sheet metal members in a direction transverse to the bolts may occur and may rub off catalytically active material.

A catalytic converter disclosed in French Patent Disclosure 2 617 903 has a housing which contains catalyst means having a packet of annular sheet metal members which have coatings containing catalytically active material. The sheet metal members are in general conical, but at least one sheet metal member of each pair of adjacent sheet metal members is provided with waves or bulges. The sheet metal men, bets are arranged in a cage which has an annular flange at one end of the packet, a plate at the other end and some rods connected to said plate and to the annular flange and distributed around the packet. According to the last-cited publication, the sheet metal members may be connected to one another or to the annular flange or to the plate by spot welding. Since the sheet metal members touch one another at least partly only in the case of linear wave summits or point-like bulge peaks and have coatings, it would however be very difficult and expensive to weld all sheet metal members to one another in pairs. Moreover, in spite of such spot welds from point to point, which are practically inevitably staggered relative to one another in the axial direction of view, the sheet metal members could still experience relatively strong deformation and movement relative to one another. Since the sheet metal members are subjected to vibrations, other accelerations, temperature change and temperature gradients during the use of the catalytic converter, there is a great danger in this catalytic converter too that the sheet metal members and especially their coatings will be damaged.

International Patent Disclosure 93/21 431 furthermore discloses catalyst means having a cylindrical winding and passages parallel to its axis. The winding is formed from two pairs of adjacent strips, a strip having waves parallel to the axis and a waveless, originally flat strip alternating with one another. The strips originally consist of aluminum foils and are then converted by anodic oxidation into alumina and coated with catalytically active material. The catalyst means have two strip-like, electrically heatable heating elements, each of which is arranged between two adjacent strips of the winding. The two heating elements are present on one and the same lateral surface of the winding, at one end of the passages. The heating elements are preferably provided with coatings of alumina and catalytically active material.

When an internal combustion engine supplying exhaust gas to the catalyst means is started, the heating elements serve to heat the exhaust gas flowing into the passages of the catalyst means and to heat the catalyst means. Since the heating elements are at right angles to the waves and passages, they touch the strip adjacent to them and having waves at most in very small, more or less linear sections of the wave summits and are scarcely firmly connected to the strips. Since the strips of the prepared catalyst means consist mainly of alumina and since the heating elements preferably have coatings of alumina, it would in particular also be practically impossible to connect the strips of the winding and the strip-like heating elements to one another by welding or hard soldering. Since furthermore heating elements are present only on one lateral surface of the winding, they scarcely contribute towards holding together the strips of the winding and connecting them to one another. The last-cited publication also discloses no other retaining means for holding together the winding. It therefore appears probable that the strips of the winding can move relative to one another and may damage one another if the winding is subjected to vibrations, other accelerations, temperature gradients and temperature changes during use.

SUMMARY OF THE INVENTION

It is the object of the invention to provide catalyst means which avoid the disadvantages of the known catalyst means.

In particular, the sheet metal members should be stably connected to one another in such a way that they are not damaged by excess compressive forces and/or movements during use. In addition, the catalyst means should be capable of being produced with a large number of passages per unit area and also economically.

This object is achieved, according to the invention, by catalyst means for the catalytic treatment of exhaust gas, having at least one packet of sheet metal members which together bound passages and having retaining means which hold together said sheet metal members, wherein the retaining means have spacer members arranged between the sheet metal members, wherein each sheet metal member not forming an end of the at least one packet rests, with at least one surface section, against a spacer member and, with a surface section facing away from this spacer member, against one of another sheet metal member and of another spacer member and wherein the sheet metal members and spacer members are firmly connected to one another.

The invention furthermore relates to a catalytic converter having catalyst means of the stated type, the catalyst means being arranged in a housing which has an inlet and an outlet for the exhaust gas.

The invention also relates to a process for the production of catalyst means for the catalytic treatment of exhaust gas, having at least one packet of sheet metal members which together bound passages and having retaining means which hold together said sheet metal members, wherein spacer members belonging to the retaining means are arranged between sheet metal members in such a way that each sheet metal member not forming an end of the at least one packet is brought to rest, with at least one surface section, against a spacer member and with a surface section opposite to said spacer member against one of another sheet metal member and of another spacer member, and wherein the sheet metal members and spacer members are firmly connected to one another.

According to the invention, the catalyst means have at least one packet of sheet metal members. For example, a packet which is closed and endless and encloses a cavity and an axis may be provided. However, the or each packet may instead be formed by a stack having two ends. The spacer members belonging to the or to a packet of sheet metal members can then form at least one row which, like the packet of sheet metal members, is closed and annular or has two ends.

Advantageously, two or possibly even more rows of spacer members are present, the different rows being a distance apart along the surfaces of the sheet metal members.

The sheet metal members not located at the end of the or of a packet may be arranged in pairs or individually between two spacer members of a row of spacer members.

The terms "retaining section" and "main section" used below will be explained here. A retaining section of a sheet metal member means a section of a sheet metal member which is firmly held by the other sheet metal members and/or by the retaining means and which rests against a spacer member at least at a sheet metal member not located at an end of a packet. A sheet metal member located at an end of a packet of sheet metal members also has at least one firmly held retaining section which however may not rest against a spacer member but only against a retaining section of another sheet metal member and is thus firmly connected to a spacer member directly or at least via a retaining section of another sheet metal member.

A "main section" of a sheet metal member is understood as meaning a section of a sheet metal member which bounds at least one passage and rests neither against a spacer member nor against a retaining section of another sheet metal member.

The retaining sections can, for example, be connected individually or in pairs by weld joints and/or hard solder joints and/or clamping connections to spacer members of the retaining means and directly or via spacer members, firmly and rigidly to one another. If the sheet metal members and spacer members are connected to one another by hard solder joints, a solder which remains solid at least up to the maximum temperatures of the exhaust gas and of the catalyst means which occur during use of the catalyst means can be used for forming the hard solder joints. The solder used may remain solid, for example, up to a temperature of at least 1000° C.

In the case of the catalyst means according to the invention, the spacer members hold at least one retaining section of each sheet metal member, separately or together with a retaining section of an adjacent sheet metal member, at a defined distance from a retaining section of another sheet metal member. Furthermore, a row of spacer members, together with those retaining sections of the sheet metal members which are coordinated with this row, forms a sort of compact part-member of the catalyst means which extends through the entire packet of sheet metal members. The retaining means therefore connect the sheet metal members to one another in a stable manner and ensure that those main sections of the sheet metal members which together bound passages are never pressed excessively against one another when the catalyst means are used in a catalytic converter and do not move or move at most very slightly—namely within the limits determined by their deformability.

The main sections of the sheet metal members have, for example, an inner region or core region comprising a metallic material, namely comprising a steel which, in addition to iron, contains about 20% by weight of chromium, about 5% by weight of aluminum and possibly also a small amount of lanthanum and/or yttrium. Those surface sections of the sheet metal members which bound the passages preferably have a coating. This coating has a rough, porous part comprising a metal oxide, namely alumina, which is frequently referred to as a "wash coat" and to which a catalytically active material is applied. This may contain at least one noble metal such as platinum and/or rhodium. The retaining sections of the sheet metal members are preferably untreated and uncoated, so that their surfaces consist of the same material as the inner regions or core regions of the main sections of the sheet metal members, i.e. of steel.

The thickness of the metallic, inner region or core region of the sheet metal members is preferably at most 0.1 mm and, for example, about 0.03 mm to 0.07 mm. The thickness of each coating consisting of alumina is preferably at most or about 0.05 mm. The layers or coatings consisting of catalytically active material are preferably substantially thinner than the uncoated sheet metal members and than the alumina coatings and may also have gaps. The total thickness of a section of a sheet metal member which is provided on both surfaces with alumina and catalytically active material may then be preferably at most 0.3 mm and particularly preferably at most 0.2 mm.

In a preferred embodiment of the catalyst means, at least one first sheet metal member of each pair of adjacent sheet metal members of a packet has at least one main section with a number of protuberances. The other, second sheet metal member of the relevant pair of sheet metal members is then, for example, free of protuberances so that a first sheet metal member having protuberances and a second sheet metal member having no protuberances alternate with one another in the or each packet. However, it is also possible for all sheet metal members to have protuberances. In both cases, the adjacent sheet metal members may touch one another at the highest points of the protuberances.

The protuberances are preferably formed by waves. However, it is also possible for the protuberances to be formed by bulges, at least most of which are a distance away from the edges of the sheet metal member and have closed, for example approximately circular, contour lines. Some of the bulges may then project on one side and some on the other side of regions of the sheet metal member which are located between them.

The or each main section of a sheet metal member which is provided with protuberances can define, for example, a flat middle surface which runs between the summits of the waves or between the peaks of the bulges. The second sheet metal members may then be at least essentially flat, i.e. apart from any elastic deformations caused by the pressure of the first sheet metal members and apart from any transitions between the coated main sections and uncoated retaining sections. Each sheet metal member then defines two osculating planes, each of which molds to one of the surfaces of the sheet metal member. In the case of the first sheet metal members having protuberances, the osculating planes mold to the highest points of the protuberances. In the case of the essentially flat, second sheet metal members, the osculating planes mold to the flat surfaces.

However, it is also possible for them a in section of at least some of the first sheet metal members to define a middle surface which runs between the wave summits or bulge peaks and is curved at least in part. The second sheet metal member may then likewise, at least in part, be smoothly curved and at least approximately parallel to the middle surface of at least one adjacent first sheet metal member, so that the second sheet metal members mold to the summits of the waves or to the peaks of the bulges and bridge adjacent waves or bulges. Instead of osculating planes, the sheet metal members then define smoothly curved osculating surfaces which mold to their surfaces and form, for example, involves in cross-section.

The sheet metal members and spacer members are preferably formed in such a way that the maximum distance between facing surface sections of the main sections of two adjacent sheet metal members together bounding at least one passage is relatively small. If the sheet metal members define flat osculating planes parallel to one another, the stated, maximum distance is at right angles to these. If a packet of sheet metal membered has alternate first sheet metal members having waves and second sheet metal members without waves and if the adjacent sheet metal members rest against one another at the wave summits of the first sheet metal members, the abovementioned, maximum distance is equal to the wave height measured from wave summit to wave set, minus the thickness of a first sheet metal member.

The height of the protuberances which is measured between coated surfaces of a first sheet metal member which are opposite to one another, from wave summit to wave summit of the waves or from peak to peak of the bulges, may vary from place to place and, for example in the case of a sleeve-like and/or annular catalyst support, may increase from the inside to the outside or be of the same magnitude everywhere. The stated height is preferably at least 0.3 mm, preferably at most 2 mm and, for example, at most 1.5 mm. Particularly when the heights measured from wave summit to wave summit or from peak to peak are of the same magnitude everywhere, the height is preferably at most 1 mm and, for example, about 0.5 mm. If waves are present, the wave length is preferably at least twice and, for example, about three times as large as the (maximum) wave height.

The small dimension of the stated, maximum distance and of the height of the waves or bulges makes it possible for the catalyst means to have a large number of passages per unit area in a section at right angles to the passages. If the catalyst means have first sheet metal members adjacent to one another in pairs and provided with waves and second, waveless sheet metal members, the catalyst means can have, for example, at least about 62 passages per square centimeter (i.e. at least about 400 passages per square inch) or preferably at least about 93 passages per square centimeter (i.e. at least about 600 passages per square inch) or even at least about 124 passages per square centimeter (i.e. at least about 800 passages per square inch) in a section at right angles to the passages. The section may lie in a sectional surface which, dependent on the formation of the passages, has at least one flat part and/or is at least partly curved.

If the stated maximum distance between facing surface sections of main sections of sheet metal members is relatively small and the number of passages per unit area is correspondingly high, the exhaust gas comes into intensive contact with the sheet metal members when the catalyst means are used. This in turn means that the catalyst means need have only a relatively small volume at a predetermined flow rate of the exhaust gas and can be produced economically. The stated maximum distance is preferably at most 2 mm, particularly preferably at most 1.5 mm, preferably at least 0.1 mm and, for example, at least or about 0.3 mm.

In the production of the catalyst means, for example, at least one uncoated strip-like sheet metal part serving to form a plurality of first sheet metal members or a plurality of uncoated sheet metal parts each serving for the production of an individual, first sheet metal member can be provided with protuberances by cold forming, for example deep drawing or rolling. Alumina and catalytically active material can then be applied to at least one sheet metal part serving for the formation of a plurality of sheet metal members or to a plurality of sheet metal parts, each of which serves for the formation of a single sheet metal member, before the sheet metal members are assembled together with members of the retaining means to give catalyst means. Even in the case of a large number of passages per unit area and in the case of correspondingly small cross-sectional dimensions of the passages, this makes it possible to produce satisfactory coatings of alumina and catalytically active material.

In an advantageous embodiment of the catalyst means, each sheet metal member is quadrilateral in plan view and—if the sheet metal members define osculating planes—in a projection at right angles to the osculating planes, said sheet metal member having, for example, at least two straight edges parallel to one another and forming, for example, an essentially right angled or oblique-angled parallelogram. The sheet metal members of said catalyst support my be produced from sheet metal parts having at least two straight edges parallel to one another, for example from quadrilateral, i.e. rectangular or square, metal sheets or from metal strips having two edges parallel to one another, in such a way that no sheet metal waste or at most a relatively small amount of sheet metal waste is formed. Since the preferably very thin sheet metal used for catalyst means is relatively expensive, the at least substantial avoidance of sheet metal waste helps to achieve economical production of catalyst means.

The quadrilateral sheet metal members may, for example, be arranged and distributed around an axis in such a way that their edges facing the axis together define an inner surface which encloses the axis and an inner space or cavity and is at least essentially closed in cross-section. The catalyst supports may then have straight and/or curved passages running outwards away from this inner surface.

In an advantageous further development, each quadrilateral sheet metal member has, at at least one edge running in general along the passages and preferably at two edges located on opposite sides of the passages, a retaining section which rests against a spacer member of the retaining means directly and/or via an adjacent retaining section of an adjacent sheet metal member and is rigidly connected to said retaining section. The sheet metal members can thus be connected to one another in a stable manner without it being necessary to use bolts which pass through the passages and might interfere with the exhaust gas flow in the passages.

BRIEF DESCRIPTION OF THE DRAWINGS

The subject of the invention is subsequently illustrated in more detail with reference to embodiments shown in the drawing. In the drawings.

FIG. 10 shows a longitudinal section through a catalytic converter having two packets of sheet metal members arranged in a V-shape, FIG. 11 shows a longitudinal section along the line XI—XI of FIG. 10, through the catalytic converter shown in the latter, FIG. 12 shows a cross-section along the line XII—XII of FIG. 10, through the catalytic converter shown therein, FIG. 14 shows catalyst means drawn partly in section and partly in view, having annular sheet metal members, FIG. 15 shows an unwound section along the arc XV—XV in FIG. 14 on a larger scale.

It should be noted that various Figures are highly schematic and are not to scale. The sheet metal members are, for example, frequently drawn in exaggerated thickness in comparison to their contour dimensions. Furthermore, the protuberances—i.e. waves or bulges—of the first sheet metal members in many Figures are drawn with greatly exaggerated sizes compared with the contour dimensions of the catalyst means. Moreover, the main sections provided with coatings of alumina and catalytically active material and the preferably untreated, uncoated retaining sections of the sheet metal members were drawn with the same thickness for simplicity.

DESCRIPTION OF THE PREFERRED EMBODIMENTS

Figure 1:
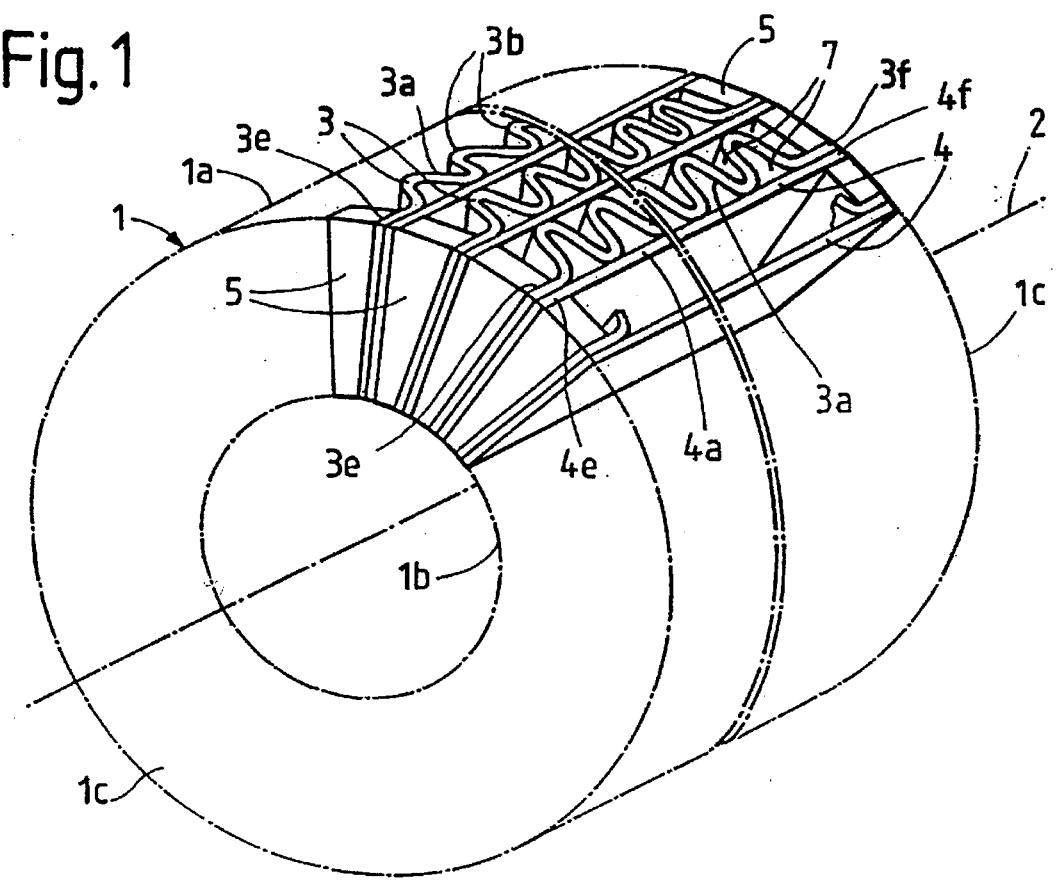
FIG. 1 shows an oblique view of a part of hollow cylindrical catalyst means having first and second sheet metal members, each of which consists of a separate part.
Figure 2:
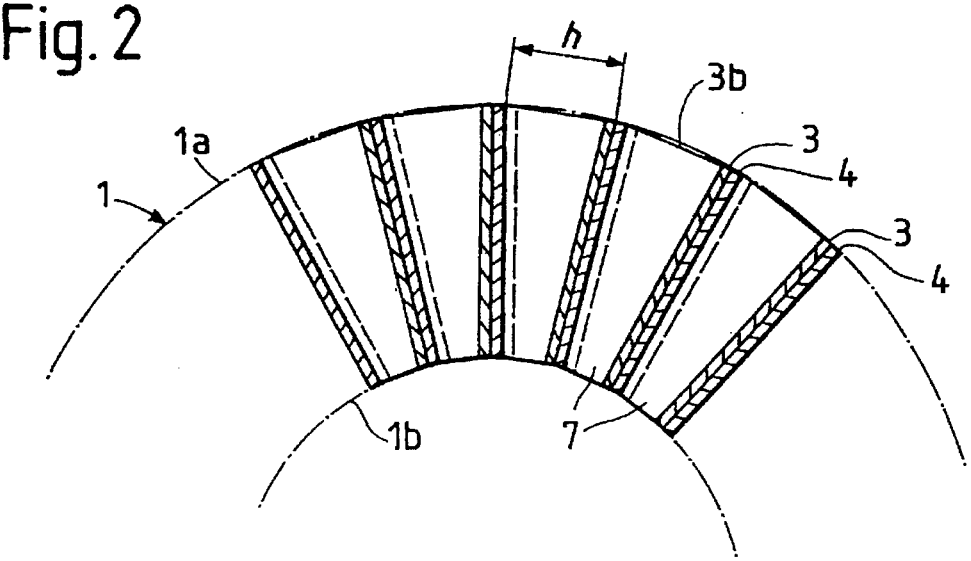
FIG. 2 shows a cross-section, at right angles to the axis, through a part of the catalyst means.
Figure 3:
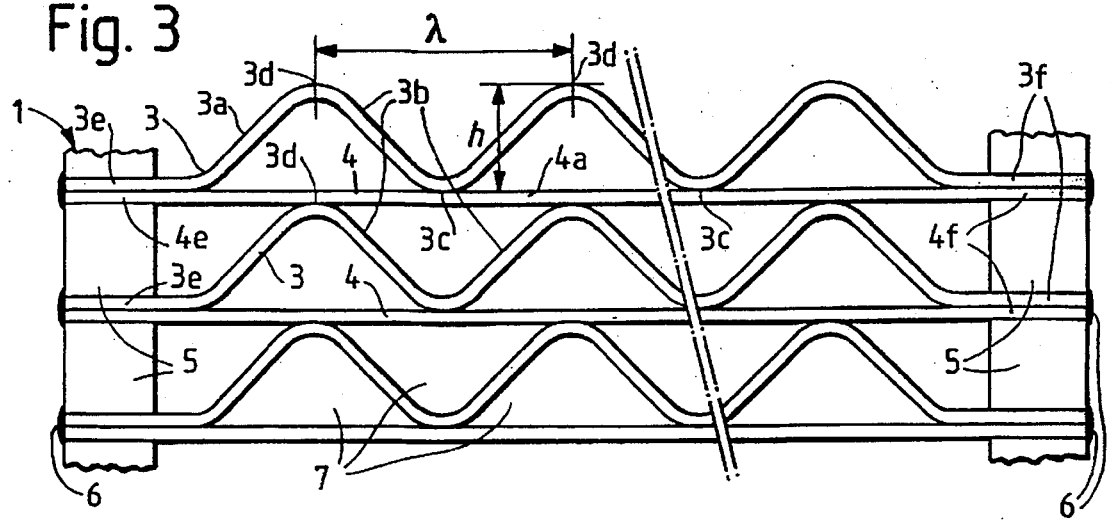
FIG. 3 shows a simplified view of a section of the catalyst means, viewed in a radial direction towards the outer lateral surface of the catalyst means.

The catalyst means shown in FIGS. 1 to 3 have a catalyst support 1 which is annular and/or sleeve-like and at least essentially of a hollow cylindrical form. The catalyst support 1 defines an axis 2 an has an outer lateral surface 1a, an inner lateral surface 1b and two end surfaces 1c. The two lateral surfaces 1a, 1b are parallel to the axis 2 and at least essentially circular in cross-section. The two end surfaces 1c are at least essentially flat and are at right angles to the axis and the lateral surfaces 1a, 1b.

The catalyst support 1 has a packet of first sheet metal members 3 and second sheet metal members 4, which are arranged around the axis 2 and alternate with one another along the circumference of said catalyst support. The sheet metal members 3 and 4 have a quadrilateral, namely rectangular, contour but may also be square.

Each first sheet metal member 3 has a main section 3a which occupies the largest part of said sheet metal member and is provided with protuberances, namely waves 3b. These are straight and parallel to one another and extend radially to the axis 2, from the outer lateral surface 1a to the inner lateral surface 1b of the catalyst support 1. The waves 3b have wave summits 3c located at the bottom in FIG. 3 and wave summits 3d located at the top in FIG. 3. Each first sheet metal member 3 has, at its edges adjacent to the two end surfaces 1c of the catalyst support 1, a flat, strip-like, radial retaining section 3e or 3f which therefore runs along the waves 3b of the relevant sheet metal member.

In FIGS. 2 and 3, the wave height h measured between opposite surfaces of a first sheet metal member 3 from wave summit to wave summit is also indicated. This height is measured, for example, along a straight line which is at right angles to the stated, flat wave middle surface of the relevant sheet metal member 3. The wave height h decreases from the outside to the inside, i.e. from the out lateral surface 1a to the inner lateral surface 1b. The wave length denoted by lambda in FIG. 3—i.e. the distance, measured parallel to the axis 2, between two directly adjacent wave summits 3c or 3d—is of equal magnitude on the outside and inside.

The second sheet metal members 4 are at least essentially flat and lie in planes passing through the axis 2. Each second sheet metal member 4 has an at least essentially flat main section 4a which is opposite the main section 3a of the two first sheet metal members 3 directly adjacent to it. Each second sheet metal member 4 furthermore has two strip-like retaining sections 4e or 4f which of course are also flat and each of which runs along the waves of the first sheet metal members 3 directly adjacent to it and rests against a retaining section 3e or 3f of one of the latter.

Each sheet metal member 3, 4 has two surfaces which are opposite to one another and each of which has a surface section belonging to the main section 3a or 4a of the sheet metal member, a surface section belonging to the retaining section 3e or 4e of the sheet metal member and a surface section belonging to the retaining section 3f or 4f of the sheet metal member. The inner regions or core regions of the main sections 3a, 4a, 3, 4 of the sheet metal members consist, for example, of the steel mentioned in the introduction. Those two surface sections of the main section 3a, 4a of each sheet metal member 3 or 4 which are opposite to one another are provided with a coating of alumina to which catalytically active material which contains, for example, platinum and/or rhodium is applied. The retaining sections 3e, 3f, 4e, 4f of the sheet metal members are preferably untreated and uncoated so that their surface sections consist of steel. Since the retaining sections are untreated and thinner than the main sections 3a, 3b, a step not shown FIGS. 1 to 3 may result between the surface sections of said main sections and the surface sections of the retaining sections.

Each sheet plate member defines two osculating planes or flat osculating surfaces, each of which molds to one of the two surfaces of the sheet metal member 3 or 4. The two osculating planes defined by a first sheet metal member 3 mold to the wave summits 3c or 3d of the relevant sheet metal member. Those surface sections of the retaining sections 3e, 3f which are further away from the wave summits 3d of a sheet metal member 3 lie, for example, at least approximately in the osculating plane which molds to the wave summits 3c. The osculating planes defined by a second sheet metal member 4 mold to the surface sections of the main section 4a of the relevant sheet metal member. All osculating planes are parallel to the axis and pass at least approximately through it so that they are also at least approximately radial to the axis 2.

The catalyst support 1 furthermore has retaining means which are formed at least essentially by spacer members 5. Each of these is arranged between a retaining section 3e and 3f of a first sheet metal member 3 and a retaining section 4e or 4f of a second sheet metal member 4. Each spacer member 5 has two flat surfaces which are opposite to one another and parallel and radial to the axis and with which said spacer member rests against retaining sections 3e, 4e or 3f, 4f and which, in the radial direction, are of the same length as the retaining sections 3e, 3f, 4e, 4f. Those surfaces of each spacer member which lie in the outer lateral surface 1a and in the inner lateral surface 1b are, for example, flat. Each spacer member 5 furthermore has two flat surfaces which are at right angles to the axis 2 and one of which is at least approximately flush with the radial edges of the sheet metal members 3, 4. The spacer members 5 consist of a metallic material, namely steel, but may also be provided with coatings of alumina and catalytically active material on their surfaces facing the waves 3b.

Each retaining section 3e, 3f, 4e, 4f of a sheet metal member 3 or 4 rests with one flat surface section along the entire length of an edge of a sheet metal member against a spacer member 5 and, with the surface section opposite to this, against a surface section of the retaining section of a sheet metal member adjacent to it. The retaining sections 3e, 4e, 3f, 4f resting against one another are connected, namely welded, rigidly to one another in pairs and to the spacer members 5 resting against them. The weld joints indicated schematically in FIG. 3 and denoted by 6 preferably have weld seams which extend along the entire radial dimensions of the waves, retaining sections and spacer members. As yet to be described, spot-welded joints may also be formed in the production of the catalyst supports, possibly before formation of the weld seams.

The spacer members 5 arranged between adjacent sheet metal members 3, 4 and holding these a distance apart have dimensions parallel to the wave height h and furthermore are welded to the sheet metal members in such a way that the distance, measured parallel to the wave height h, between the facing surfaces of two second sheet metal members following one another along the circumference of the catalyst support is equal to the wave height h. The flat main section 4a of each second sheet metal member 4 then rests with one of its surface sections against the wave summits 3c and with its other surface section against the wave summits 3d of the first sheet metal members 3 directly adjacent to it and bridges these wave summits. A passage 7 for the exhaust gas then results between each pair of adjacent wave summits 3c or 3d bridged by a second sheet metal member 4. The spacer members 5 together with the sheet metal members likewise bound some exhaust gas passages.

It should be noted that the spacer members 5 may have dimensions, and may be connected to sheet metal members and to one another, such that the distance, measured parallel to the wave height h, between two sheet metal members 3 and 4 connected to one another by a spacer member is slightly smaller than was the wave height h of the first sheet metal members 3 in the relaxed state before assembly of the catalyst support 1. On assembly of the catalyst support 1, the waves 3b are then slightly elastically deformed and tensioned so that they come into contact with the second sheet metal members 4 with a compressive force or pretension in a springy manner.

The retaining sections 3e, 3f, 4e, 4f and spacer members 5 are connected to one another along the entire length of the passages. The spacer members 5 resting against the retaining sections 3e, 4e together form a closed row running around the axis 2. The spacer members 5 resting against the retaining sections 3f, 4f likewise form a closed row running around the axis 2. The catalyst support 1 thus has two rows of spacer members 5. Along the axis 2 and along the surfaces of the sheet metal members, these two rows are a distance apart which is equal to the axial distance between the retaining sections 3e, 4e and the retaining sections 3f, 4f and is thus substantially greater than the wavelength.

In the complete catalyst support 1, each first sheet metal member 3 is directly connected, at both retaining sections 3e, 3f located on opposite sides of the wavy main section 3a, to those retaining sections 4e or 4f of an adjacent, second sheet metal member 4 which rest against said retaining sections 3e, 3f, and furthermore rigidly connected via spacer members 5 to another adjacent, second sheet metal member 4. Accordingly, each retaining section 3e, 3f, 4e, 4f is connected in a rigid and stable manner directly or indirectly via at least one spacer member 5 to all other edge sections located at the same end surface 1c. Each of the two rows of spacer members 5, together with the retaining sections 3e, 4e or 3f, 4f, forms a sort of compact annular part-support of the catalyst support 1. Furthermore, those pairs of retaining sections 3e, 4e or 3f, 4f which rest against one another and follow each other along the circumference of the catalyst support are held by the spacer members 5 distances apart which are defined by the spacer members. Accordingly, the first sheet metal members 3 located closest to one another along the circumference of the catalyst support are held by the spacer members 5 a distance apart which is defined by the spacer members 5 and the thicknesses of the retaining sections of the sheet metal members. Of course, the same also applies to the second sheet metal members 4.

The internal diameter of the catalyst support is preferably at least 30 mm and, for example, about 50 mm. The external diameter of the catalyst support may be, for example, about twice as large as the internal diameter. The length, i.e. that dimension of the catalyst support 1 which is measured parallel to the axis 2, is, for example, larger than the external diameter and may be, for example, 150 mm to 300 mm. The wave height h of the wave 3b which is measured between surfaces of a first sheet metal member 3 which are opposite to one another is preferably at least 0.3 mm and, for example, about 0.5 mm at the inner lateral surface 1b. At the outer lateral surface 1a, the wave height h is then larger, depending on the diameter ratio between the outer and the inner lateral surface, and is, for example, about 1 mm.

For the production of catalyst means having catalyst supports 1, it is possible, for example, first to produce at least one flat, uncoated strip-like sheet metal part which has parallel edges and serves for the formation of the sheet metal members 3 and at least one said sheet metal part for the formation of the sheet metal members 4, by cutting a broad metal sheet or a quadrilateral metal plate or directly by rolling. The widths of these strip-like sheet metal parts or metal strips may be, for example, equal to the intended radial dimension of the street sheet metal members.

The metal strip intended for the formation of the first sheet metal members 3 may then be provided, for example in the regions subsequently forming the main sections 3a, by means of deep drawing, with waves running transverse to the longitudinal direction of the strip. As already stated, the wave height h at the outer lateral surface 1a is greater than that at the inner lateral surface 1b, while the wavelength is of equal magnitude on the inside and outside. The waves may have relatively strongly S-shaped flanks on the inside and relatively straight flanks on the outside. In the case of the stated ratios of the wave heights, the outer edge of the first sheet metal members 3 is then, for example, at most 25% or even only at most 10% longer than the inner edge. Such a difference in lengths can be readily achieved during forming of the waves by extending the sheet metal without cracks occurring in the sheet metal members.

Furthermore, spacer members 5 can be produced and can be fixed, for example by spot welding, to flat sections of the sheet metal strip which are intended for formation of the retaining sections 3e, 3f.

Those regions of the sheet metal strips which serve for the formation of the main sections 3a and 4a of the sheet metal members 3 and 4, respectively, are then provided on both surfaces with an alumina coating, to which catalytically active material is then applied. Preferably, neither alumina nor catalytically active material is applied to the retaining sections 3e, 3f, 4e, 4f. The same also applies to the steel strips which serve for the formation of the spacer members 5 or at least to their surfaces intended for welding.

The sheet metal strips can then be cut so that first sheet metal members 3 and second sheet metal members 4 connected by spacer members 5 are formed. The sheet metal members 3, 4 and spacer members 5 are then assembled to give a catalyst support 1, the sheet metal members 3, 4 being welded in pairs to one another and to spacer members 5 in their retaining sections so that the weld seams already mentioned are formed.

The production process can be modified in various ways. For example, the weld joints 6 or at least the weld seams formed after spot welding can be replaced by hard solder joints. Furthermore, the sequence of certain process steps can be changed. For example, in the production of the first sheet metal members 3, a separate, quadrilateral sheet metal part having the required size can first be cut from a strip or from a plate for each of said sheet metal members and then each of these sheet metal parts can be provided with waves and possibly connected by means of spacer members. However, the alumina and the catalytically active material are advantageously applied to the first sheet metal members 3 only when their main sections 3a are provided with waves 3b. Furthermore, the alumina coatings and the catalytically active material should always be applied to the sheet metal members 3, 4 before they are assembled to give a catalyst support.

The lateral surfaces 1a and 1b of the catalyst support 1 are formed and/or defined by those surfaces of the spacer members 5 which are adjacent to the lateral surfaces and, for example, are flat and especially by the outer or inner edges or—more precisely—very narrow edge surfaces of the sheet metal members 3, 4. The stated edges or narrow edge surfaces of the sheet metal members 3, 4 are, for example, approximately flat and/or, in the case of the wavy main sections 3a of the sheet metal members 3, slightly curved in some way in the axial direction, possibly as a function of the shaping of the waves. The lateral surfaces 1a and 1b therefore may not be completely cylindrical but—as already stated—are at least essentially cylindrical and at least essentially circular in cross-section. Those end surfaces 1c of the catalyst support 1 which are formed by those radial edges of the sheet metal members 3, 4 which are welded to one another and by those surfaces of the edge members 5 which are at right angles to the axis 2 may not be completely flat but are at least essentially flat, depending on the manufacturing precision and on the welding method, and are at right angles to the axis 2. In addition, during production it is also possible to grind the catalyst support 1 after welding of the sheet metal members 3, 4 and spacer members 5 or to subject said catalyst support to another material-removing machining process so that the lateral surfaces 1a, 1b are then exactly cylindrical and/or the end surfaces 1c are exactly flat.

Figure 4:
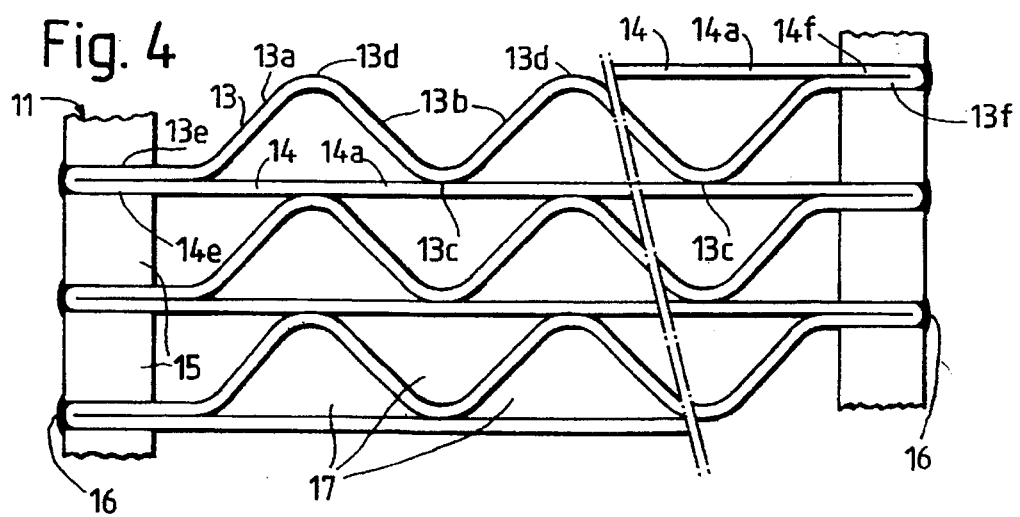
FIG. 4 shows a view, corresponding to FIG. 3, of a section of other catalyst means in which the sheet metal members consist of continuous sections of a one-piece strip.

The catalyst means shown partly in FIG. 4 have a catalyst support 11 which, for example, is annular and/or sleeve-like. Said catalyst support has first sheet metal members 13, second sheet metal members 14 and retaining means with spacer members 15. Each first sheet metal member 13 has a main section 13a with waves 13b. These have wave summits 13c and 13d lying on different sides of a flat wave middle surface running axially through the middle of the wave flanks. Each first sheet metal member 13 has, on opposite sides of its main section 13a, a flat retaining section 13e or 13f parallel to the waves. The retaining sections 13e and 13f are located on different sides of the stated wave middle surface so that their flat surfaces which are opposite to one another lie in the flat osculating surfaces which mold to the wave summits 3c or the wave summits 3d.

The second sheet metal members 14 are essentially flat and each have a main section 14a and two retaining sections 14e or 14f which are located on opposite sides of said main section and are parallel to the waves. Each retaining section 13e rests against a retaining section 14e. Similarly, each retaining section 13f rests against a retaining section 14 f. The sheet metal members 13, 14 all consist of sections of a one-piece metal strip. Apart from the retaining sections located at the ends of this metal strip, each retaining section 13e is cohesive with a retaining section 14e and each retaining section 13f is cohesive with a retaining section 14f. The spacer members 15 are arranged analogously and are connected by weld joints 16 to retaining sections 13e, 14e or 13f, 14f as in the case of the corresponding parts of the catalyst support 1. The adjacent sheet metal members 13, 14 bound passages 17 for the exhaust gas.

In the production of a catalyst support 11, a strip-like sheet metal part, i.e. a metal strip, which serves for the formation of both the first and the second sheet metal members 13, 14 and whose width is equal to the desired radial dimension of the sheet metal members is produced. This metal strip is then provided with waves in the regions serving for the formation of the main sections 13a. Furthermore, the metal strip is folded, for example after fastening of the spacer members 15 and after application of alumina and catalytically active material.

Unless stated otherwise above, the catalyst support 11 is formed similarly and produced similarly to the catalyst support 1. The catalyst support 11 accordingly also has characteristics similar to those of catalyst support 1.

Instead of all sheet metal members 13, 14 of the catalyst support 11 being formed from a single one-piece metal strip, the catalyst support 11 may be produced from two or more one-piece strips, each of which forms a plurality of sheet metal members of the catalyst support 11. It may even be possible to form each sheet metal member 13, 14 shown in FIG. 4 from a sheet metal piece which is separate prior to welding.

Figure 5:
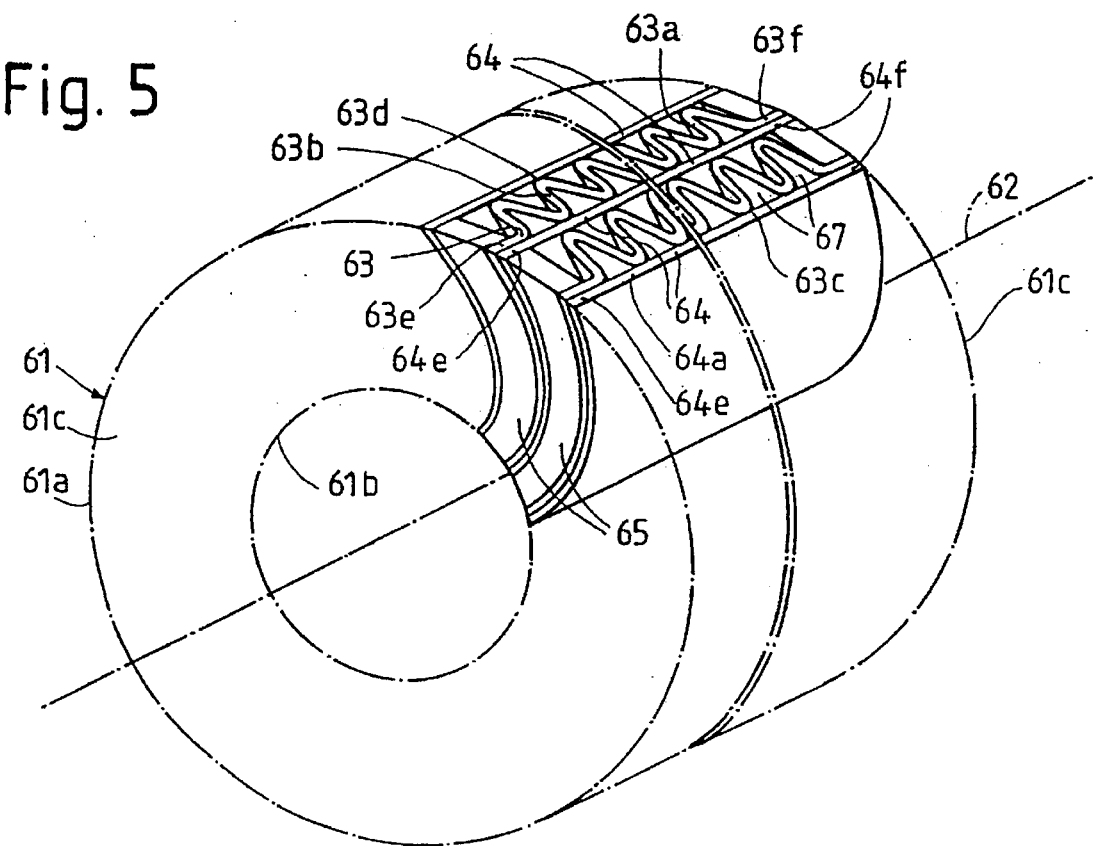
FIG. 5 shows an oblique view of hollow cylindrical catalyst means whose sheet metal members are curved in axial view in the form of involutes.
Figure 6:
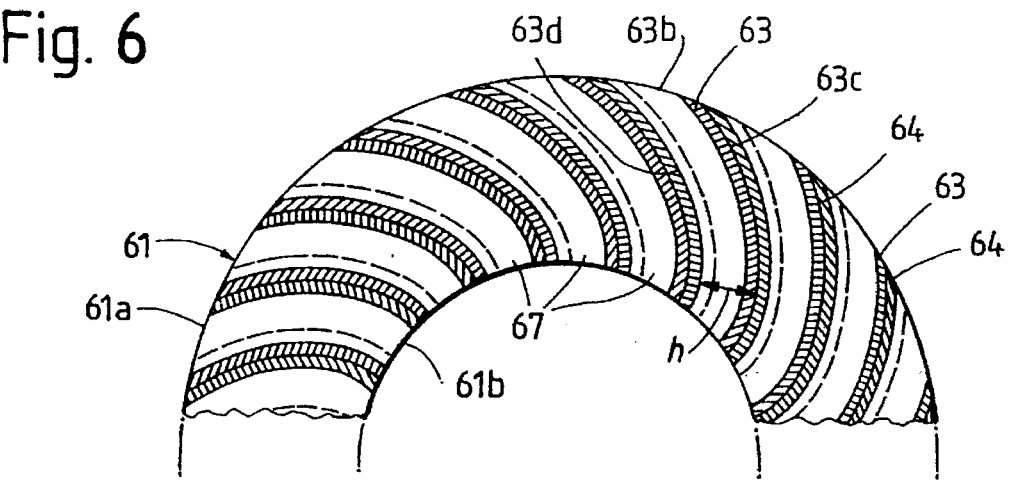
FIG. 6 shows a cross-section, at right angles to the axis, through a region of the catalyst means shown in FIG. 5.

The catalyst means shown schematically in FIGS. 5 and 6 have an annular and/or sleeve-like, at least essentially hollow cylindrical catalyst support 61. This encloses an axis 62 and defines an outer lateral surface 61a, an inner lateral surface 61b and two end surfaces 61c. The surfaces 61a, 61b, 61c are formed analogously to the corresponding surfaces of the catalyst support 1.

The catalyst support 61 has first sheet metal members 63, second sheet metal members 64 and retaining means with spacer members 65. The first sheet metal members 63 have a main section 63a with waves 63b. These have wave summits 63c at the wave troughs and wave summits 63d at the wave peaks. The waves 63b run along planes at right angles to the axis 62, from the outer lateral surface 61a to the inner lateral surface 61b. Each first sheet metal member 63 has, at its edges adjacent to the two end surfaces 61c and therefore on opposite sides of the main section 63a, a retaining section 63e or 63f running along the waves. The two osculating surfaces which mold to the wave summits 63c or 63d of a first sheet metal member 63 and the retaining sections 63e, 63f are curved in a direction of view parallel to the axis 62 and in a cross-section at right angles to the axis 62 and in fact form an involute to the inner lateral surface 61b which is circular in cross-section. In sections parallel to the axis 62, the stated osculating surfaces and the retaining sections 63e, 63f are straight and parallel to the axis 62.

Each second sheet metal member 64 has a main section 64a opposite the main section 63a of the adjacent, first sheet metal members 63 and a retaining section 64e or 64f at the two end surfaces 61c. The second sheet metal members 64 are involute-like in the same way as the stated osculating surfaces in axial view and in cross-sections at right angles to the axis 62 and are straight in sections parallel to the axis 62. The retaining sections 63e, 63f of each first sheet metal member 63 rest against the retaining sections 64e or 64f of an adjacent, second sheet metal member 64.

The spacer members 65 serving as retaining means are arranged between retaining sections 63e and 64e or 63f and 64f of adjacent sheet metal members and have involute-like surfaces in the axial direction of view and straight surfaces in axial section, which surfaces rest against the retaining sections 63e, 64e or 63f, 64f. In addition, the spacer members 65 may be formed and arranged in a manner analogous to that described for the spacer members 5 of the catalyst support 1 shown in FIGS. 1 to 3. Furthermore, the retaining sections 63e, 64e and 63f, 64f are connected rigidly to one another and to the spacer members adjacent to them by means of weld joints over their entire lengths in a manner analogous to that for the corresponding retaining sections of the catalyst support 1.

FIG. 6 also shows the wave height h of the waves 63b of a first sheet metal member 63. The wave height h is measured at right angles to the osculating surfaces which mold to the wave summits 63c or 63d and at right angles to a wave middle surface which passes through the middle of the wave flanks in the middle between the osculating surfaces. While the wave height h in the catalyst support 1 increases from the inside to the outside, that in the catalyst support 61 is constant from the inner lateral surface 61b to the outer lateral surface 61a and may be, for example, 0.5 mm to 1 mm.

Unless stated otherwise above, the catalyst support 61 is formed similarly to the catalyst support 1 and also has similar characteristics to it. In the production of the catalyst support 61, it is possible, for example, to produce a flat, strip-like sheet metal part whose longitudinal edges subsequently form the involute-like edges of the first sheet metal members 63 in the complete catalyst support 61. This strip-like sheet metal part can be rolled in a rolling mill with rolls having a wave profile and can be provided with waves running in the longitudinal direction in its region which subsequently forms the main sections 63a of the first sheet metal members 63, while those edge regions of the strip-like sheet metal parts subsequently forming the retaining sections 63e, 63f remain flat. The strip-like sheet metal part can then be bent to form involutes, for example together with steel strips which are added to them and serve for forming the spacer members 65, can be connected to the stated steel strip at points by spot welding or the like and, together with these, can be cut into first sheet metal members and spacer members. For the formation of the second sheet metal members 64, it is also possible, for example, to produce a strip-like sheet metal part, bend it in regions to form involutes and cut it. Furthermore, the sheet metal parts which serve for the formation of the main sections 63a, 64a of the sheet metal members may be coated before or after bending into involutes or cutting and finally assembled to give the catalyst support 61.

Figure 7:
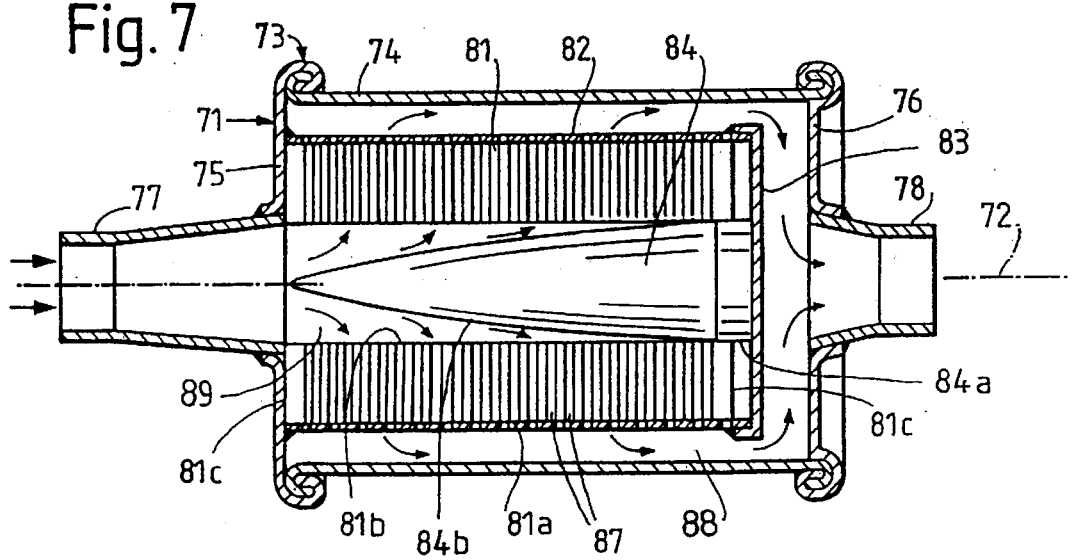
FIG. 7 shows an axial section through a catalytic converter having sleeve-like catalyst means.

A possibility for forming a catalytic converter 71 having an essentially hollow cylindrical catalyst support which is denoted here by 81 and is formed as one of the types described above with reference to FIGS. 1 to 6 will now be explained with reference to FIG. 7. The catalytic converter 71 has an axis 72 and a metallic housing 73 which is essentially rotationally symmetrical to said axis and has a cylindrical casing 74 and two radial, flat end walls 75 and 76. The casing 74 and the end walls 75, 76 are firmly and tightly connected to one another, for example by flanged edge sections. Each end wall 75, 76 has in the center an opening with a collar which is angled outwards and into which a socket serving together with the opening as inlet 77 or outlet 78 is welded or soldered.

The sleeve-like catalyst support 81 has an outer lateral surface 81a, an inner lateral surface 81b, two end surfaces 81c and radial or involute-like exhaust gas passages 87 which run along planes at right angles to the axis 72. The catalyst support 81 is fastened at one of its radial end surfaces 81c tightly to the end wall 75, for example by a weld or hard solder joint, so that the inner space of the inlet 77 leads into the cavity enclosed by the inner lateral surface 81b of the catalyst support 81. Furthermore, for example, a perforated sleeve 82 which encloses the catalyst support 81 while fitting it tightly or being separated from it by a narrow gap and is fastened at one end by a weld or hard solder joint to the end wall 75 is present. A terminating wall 83 which is connected to the sleeve 82, for example by welding or hard soldering, is arranged at the other end of the sleeve 82. An intermediate space which is annular in cross-section and, together with an intermediate space present between the end wall 76 of the housing 73 and the terminating wall 83, forms an outer cavity 88 is present between the casing 74 of the housing 73 and the sleeve 82. This is connected to the inner space of the outlet 78. An intermediate space is present between the terminating wall 83 and that end surface 81c of the catalyst support 81 which faces said terminating wall. In the central region of the terminating wall 83, a bounding member 84 which, for example, is hollow, coaxial and elongated and projects into the cavity enclosed by the inner lateral surface 81b is fastened to said terminating wall. The bounding member 84 has a short, cylindrical section 84a which projects with a tight fit or with at most small radial play into the and section of the cavity enclosed by the inner lateral surface 81b of the catalyst support 81 and encloses said cavity there more or less tightly but in such a way that the end section of the catalyst support 81 can slide on the cylindrical section 84a. The bounding member 84 furthermore has a section which extends approximately to that end of the catalyst support 81 which is fastened to the end wall 75, which section tapers towards the inlet 77, forms an approximately parabolic bounding surface 84b, which is inclined with respect to the axis 77 and, for example, conical and/or slightly convex in the axial section, and together with the inner lateral surface 81b bounds a free, inner cavity 89.

When the catalytic converter 71 is used, the exhaust gas flows through the inner space of the inlet 77, first into the free, inner cavity 89 and then into the passages 87 of that catalyst support 81, at that inner lateral surface 81a of the catalyst support 81 which serves as exhaust gas entry surface. The exhaust gas then flows out through the passages 87, emerges from the catalyst support 81 at that outer lateral surface 81a of the catalyst support 81 which serves as exhaust gas exit surface and passes through the outer cavity 88 to the outlet 78. If The catalyst support 81 and the sleeve 82 expand to different extents during the heating which occurs in operation, that end of the catalyst support 81 which is opposite to the inlet may move slightly relative to the sleeve 82 and to the bounding member 84.

The sleeve 82 could be replaced by a perforated sleeve arranged inside the inner lateral surface 81b or the perforated sleeve 82 could be omitted without replacement and the terminating wall 83 and/or the bounding member 84 could be fastened to the catalyst support 81.

The catalyst means or catalyst support described with reference to FIGS. 1 to 9 form a hollow cylinder which is circular in cross-section. For space reasons, however, it may be desirable to provide catalytic converters with housings and catalyst means which are not circular in cross-section but have flatter cross-sectional shapes.

Figure 8:
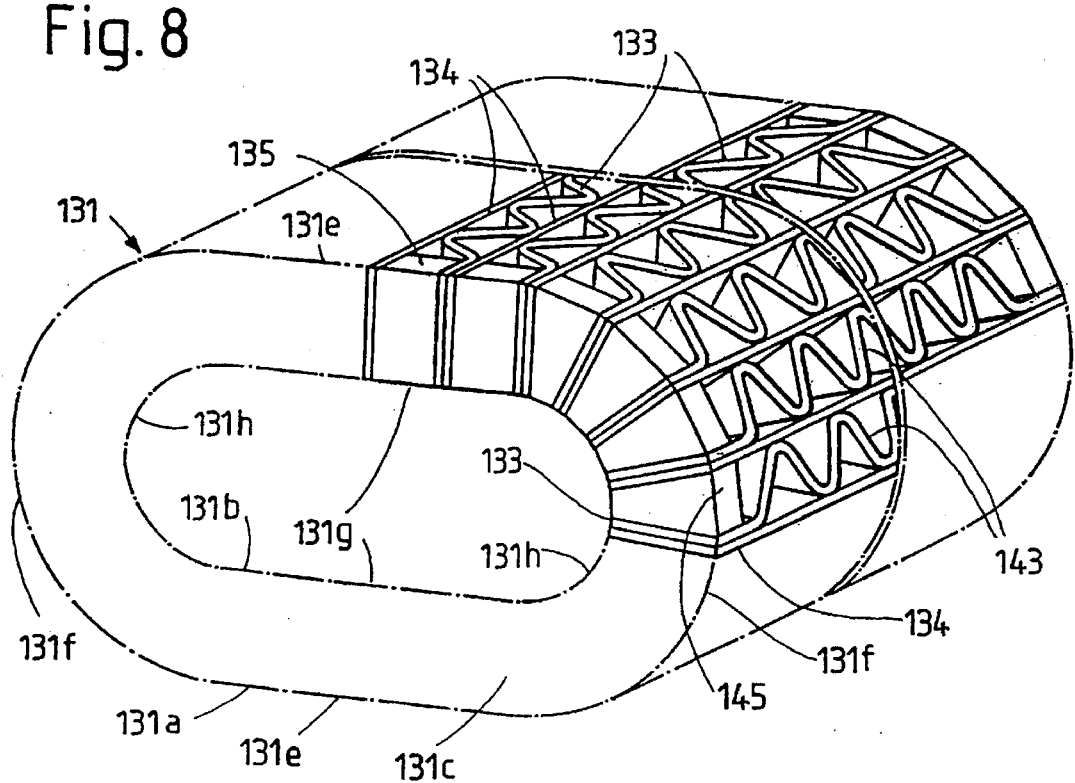
FIG. 8 shows an oblique view of catalyst means having the form of a sleeve flattened in cross-section.

The catalyst means shown in FIG. 8 have a sleeve-like catalyst support 131. This forms approximately a hollow cylinder flattened in cross-section and has an outer lateral surface 131a, an inner lateral surface 131b and two end surfaces 131c. The two lateral surfaces are parallel to an axis which is not shown and are parallel to one another in a cross-section at right angles to this axis. The two lateral surfaces have, in cross-section, the shape of rectangles whose shorter rectangular sides are replaced by semicircles. The outer lateral surface 131a accordingly has two flat sections 131e parallel to one another and two semicircular sections 131f which are curved in cross-section. The inner lateral surface has two flat sections 131g which are parallel to one another and to the sections 131e and two semicircular sections 131h which are curved in cross-section. Each of the latter is concentric with one of the semicircular sections 131f of the outer lateral surface.

The catalyst support 131 has two types of first sheet metal members which are denoted by 133 and 143. Both types of first sheet metal members have a main section with waves running from the outer to the inner lateral surface and retaining sections which are flat at two edges. One type of first sheet metal members 133 is arranged at those sections 131e, 131g of the lateral surfaces which are straight in cross-section, and said type of sheet metal members has waves which have a constant height over their entire length and run at right angles to said lateral surfaces. The other type of first sheet metal members 143 is arranged at the sections 131f, 131b which are semicircular in cross-section, and said first sheet metal members have wave heights increasing from the inside to the outside.

The catalyst support 131 furthermore has second sheet metal members 134 which are identically formed along the entire circumference and in fact are essentially flat. Furthermore, two types of spacer members 135 and 145 are present. The spacer members 135 which are arranged at those sections 131e, 131g of the lateral surfaces which are straight in cross-section are of equal width in axial view from the inner to the outer lateral surface. On the other hand, the width of the other spacer members 145 which are arranged at those sections 131f, 131b of the lateral surfaces which are curved in cross-section increases from the inside to the outside.

Unless stated otherwise above, the catalyst support 131 is formed similarly to the catalyst support 1. The catalyst support 131 may be installed in a housing having the shape of a cylinder which is flattened in cross-section, and the catalyst support may be arranged analogously to the catalytic converter according to FIG. 7.

Figure 9:
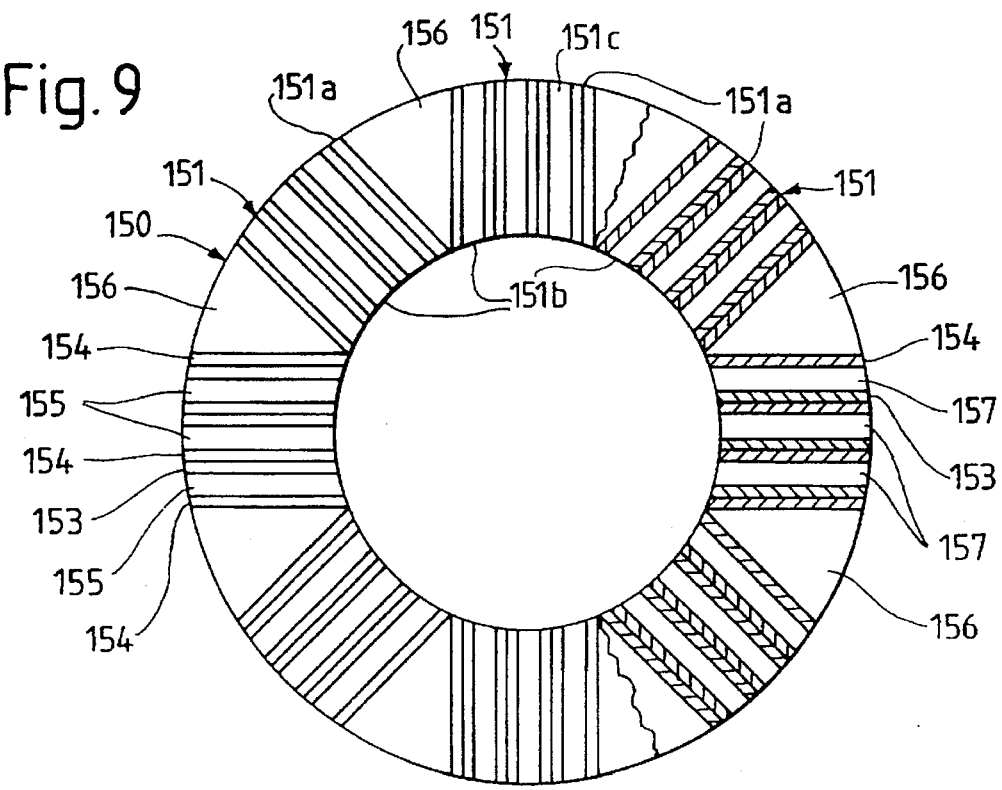
FIG. 9 shows catalyst means drawn partly in axial view and partly in section, having a plurality of packets of sheet metal members distributed around the axis.

The catalyst means 150 shown in FIG. 9 are more or less sleeve-like or annular, enclose an axis and have at least two, more expediently at least three, preferably at least six and, for example, eight catalyst supports 151 distributed around the axis. Each of these has an arc-like-outer surface 151a, an arc-like inner surface 151b and two end surfaces 151c. Each catalyst support 151 has a packet or a group of adjacent, alternating, first sheet metal members 153 and second sheet metal members 154. Each first sheet metal member 153 has a main section with straight waves which are parallel to one another, run from the inner surface 151b to the outer surface and have the same height everywhere. Each first sheet metal member 153 has a retaining section at its edges adjacent to the two end surfaces 151c. The second sheet metal members 154 are essentially completely flat and parallel to the axis and thus have in particular flat retaining sections. The waves of the first sheet metal members 153 belonging to the same catalyst support 151 or to the same packet and the second sheet metal members 154 belonging to the same catalyst support 151 or to the same packet are all parallel to one another. Each of the two ends of a packet may be formed, for example, by a second, flat sheet metal member 154.

The catalyst means 150 have retaining means with first spacer members 155 and second spacer members 156. The first spacer members 155 consist of a strip which is rectangular or square in cross-section and has cross-sectional dimensions which are constant over its entire length. The second spacer members 155 are, for example, approximately sectorial or triangular in axial view.

At least the retaining sections of the sheet metal members 153, 154 which are not located at the end of a catalyst support 151 or of a packet are adjacent to one another in pairs. The first spacer members 155 are arranged between adjacent pairs of retaining sections. Second spacer members 156 are arranged between the retaining sections of the sheet metal members 154 which form the ends of adjacent catalyst supports 151. The adjacent sheet metal members and spacer members are rigidly connected to one another, for example by weld joints or hard solder joints.

The sheet metal members belonging to the same catalyst support 151 or packet together bound passages 151 for the exhaust gas which are parallel to one another. On the other hand, no passages are present in the sectors between the catalyst supports or packets of sheet metal members. The inner surfaces 151b formed by the inner edges of the sheet metal members 153, 154 and also by the spacer members 155, 156 together form an inner lateral surface which is compact and closed apart from the orifices of the passages and which, for example, is generally circular in cross-section in the manner shown. The outer surfaces 151a are a distance apart and, together with the spacer members 156, define an enveloping surface or outer, cylindrical lateral surface which may likewise generally be circular in cross-section but has relatively large holes in the sectors between the packets of sheet metal members.

However, it should be noted that second spacer members 156 could be provided between the catalyst supports 151, not only at the edges of the sheet metal members but also between these edges. Furthermore, spacer members 156 which continue over the entire axial extension of the sheet metal members could be provided. Moreover, the lateral surfaces could be essentially oval or polygonal in cross-section.

The catalytic converter 201 shown in FIGS. 10 to 12 defines an axis 202 and has a housing 203. This has a casing 204 and two end walls 205, 206. The casing 204 is parallel to the axis 202. The casing 204 is essentially rectangular in a cross-section at right angles to the axis, but the corners of the rectangle are replaced by curved transitions. The casing thus forms two pairs of lateral or longitudinal walls 204a and 204 b which are parallel to one another in pairs, the lateral or longitudinal walls 204b being broader than the lateral or longitudinal walls 204a. The end walls 205, 206 are flat and at right angles to the axis 202 and have contours corresponding to the cross-sectional shape of the casing. The edges of the sheet metal pieces forming the casing 204 and the end walls 205, 206 are connected to one another, for example by flanges.

Each end wall 205, 206 has an opening 205a or 206a, respectively, which is bounded by an outward-projecting collar. A socket is fastened at each end wall, namely welded into the collar. Each socket has an outer cylindrical section and a section which widens towards the inner space of the housing. The two openings 205a, 206a, together with the sockets, form the inlet 207 and the outlet 208, respectively, of the catalytic converter.

Figure 13:
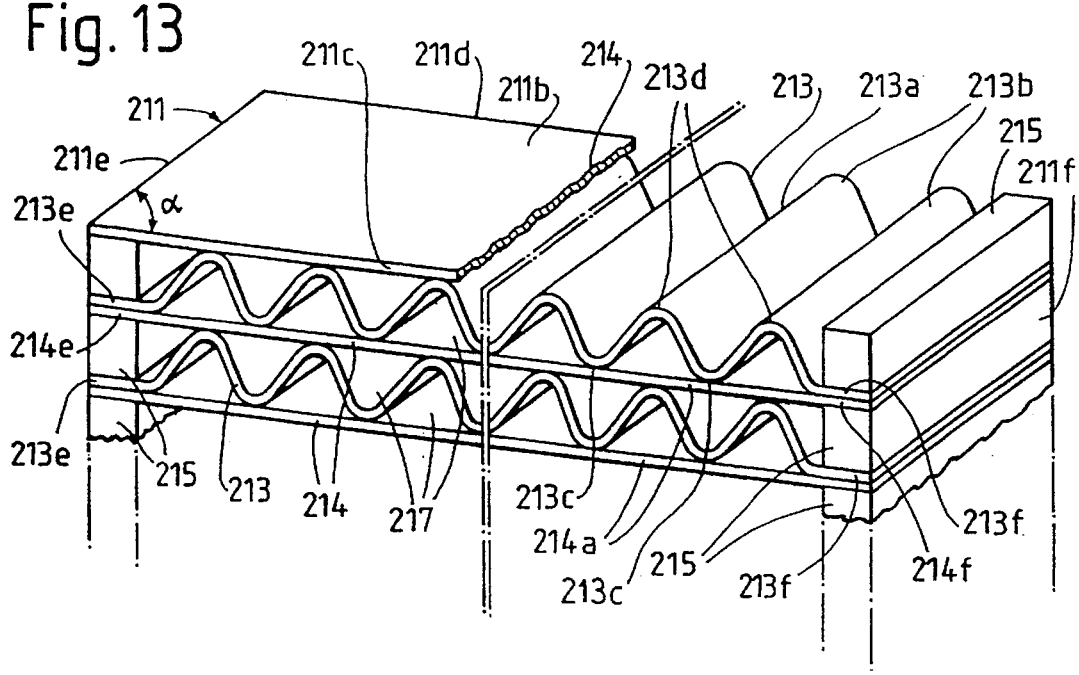
FIG. 13 shows an oblique view of a packet of sheet metal members of the catalytic converter drawn in FIGS. 10 to 12.

The catalytic converter 201 has catalyst means 210 having two catalyst supports 211, one of which is shown separately in FIG. 13. Each catalyst support 211 has essentially the shape of a prism whose base surface 211a and top surface 211b form in plan view an oblique-angle parallelogram. The base surfaces and top surfaces of the two prismatic catalyst supports 211 are parallel to the broader side or longitudinal walls 204b of the housing 203 and have the same contours as the catalyst support in the section shown in FIG. 10. Each catalyst support 211 furthermore has two side surfaces 211c, 211d running along the longer sides of the parallelogram and two end surfaces 211e, 211f running along the shorter parallelogram sides. The surfaces 211c, 211d, 211e, 211f are at right angles to the base surface 211a and to the top surface 211b. The side surface 211c and the end surface 211e make an angle with one another, denoted by alpha in FIG. 13, which differs from 90° and is at least 45°, preferably at least 60° and, for example, 75° to 87°.

Each catalyst support 211 has a packet of alternating first sheet metal members 213 and second sheet metal members 214 and retaining means with spacer members 215. Each sheet metal member and spacer member consists, for example analogously to the catalyst support described with reference to FIGS. 1 to 3, of a separate workpiece. In a plan view, the sheet metal members 213, 214 have the same contours as the base surface 211a and top surface 211b of a catalyst support 211 and thus form an oblique angle parallelogram.

Each first sheet metal member 213 has a main section 213a which is provided with waves 213b which extend parallel to one another and parallel to the end surfaces 211e, 211f, from the side surface 211c to the side surface 211d. The waves 213b have a constant wave height over their entire length. Each first sheet metal member 213 has, on opposite sides of its main section 213a and namely at the end surfaces 211e, 211f, strip-like, flat retaining sections 213e and 213f which run along the waves and are parallel to them.

Each second sheet metal member 214 has a flat main section 214a and, on opposite sides thereof, a strip-like, likewise flat retaining section 214e or 214f. In the case of the successive sheet metal members, a main section 214a is opposite each main section 213a. Furthermore, a retaining section 214e is opposite each retaining section 213e, and a retaining section 214f is opposite each retaining section 213f. Those surface sections of the two surfaces of each sheet metal member 213, 214 which belong to a main section are provided with a coating which contains alumina and, on the free surface of the costing, catalytically active material. The surface sections belonging to the retaining sections are untreated, i.e. without a coating. Each second sheet metal member is at least essentially—i.e. apart from the steps between the main section provided with coatings and the coating-free retaining sections and apart from small deformations possibly caused by any initial tension of the waves—flat.

Each sheet metal member 213, 214 in turn defines two osculating planes, each of which molds to one of the surfaces of the sheet metal members. The osculating planes defined by a first sheet metal member 213 mold to the wave summits 213c and 213d. The osculating planes defined by a second sheet metal member 214 mold to those surface sections of the flat main section 214a which are opposite to one another, and coincide with these flat surface sections. Elsewhere, the main sections of the adjacent sheet metal members touch one another at the osculating planes. The osculating planes of all sheet metal members 213, 214 which belong to the same catalyst support 211 or to the same packet of sheet metal members are parallel to one another and to the base surface 211a and to the top surface 211b of the catalyst support. The base surface 211a and the top surface 211b of each catalyst support 211 may each be formed, for example, by a second sheet metal member 214. The main section 214a of the second sheet metal members 214 then rests against the wave summits of an adjacent first sheet metal member 213 at the second sheet metal members forming the base surface or the top surface of the catalyst support, and against wave summits of two adjacent first sheet metal members 213 at all other second sheet metal members.

Each spacer member 215 consists of a straight piece of a profile rod having a quadrilateral cross-section. Each catalyst support 211 has two straight rows of spacer members which are a distance apart, one of these rows being located at the retaining sections 213e, 214e and the other row at the retaining sections 213f, 214f. Each retaining section of each sheet metal member not forming an end of a packet of sheet metal members rests with a flat surface section against a spacer member and with a flat surface section opposite to said spacer member against a flat surface section of a retaining section of an adjacent sheet metal member. Apart from the sheet metal members forming the base surface and top surface of the catalyst support, the retaining sections of the first and second sheet metal members 213, 214 thus rest directly against one another in pairs. At least the spacer members 215 not located at an end of the packet are arranged between two retaining sections 213e and 214e or 213f and 214f. The adjacent retaining sections 213e, 214e, 213f, 214f and spacer members 215 are rigidly connected to one another, for example welded to one another, analogously to the catalyst support 1 described with reference to FIGS. 1 to 3. The adjacent sheet metal members 213, 214 together bound passages 217 which, like the waves 213b, extend from the side surface 211c to the side surface 211d.

The spacer members 215 extend along the entire length of the waves and passages 217. Furthermore, the spacer members 215 belonging to the same row form, together with the retaining sections connected to them, a sort of plate-like and/or cuboid, compact part-member of a catalyst support 211. The retaining sections 213e, 214e of all sheet metal members belonging to the same catalyst support are therefore connected to one another directly and/or via spacer members, rigidly and in a stable manner. The same applies to the retaining sections 213f, 214f.

Unless stated otherwise above, the catalyst supports 211 are also formed analogously to the catalyst support 1 in other respects.

The two catalyst supports 211 are tightly fastened, for example welded, at their end surfaces 211e, to regions of the end wall 205 which are located in FIG. 10 on opposite sides of the orifice of the inlet 207. The side surfaces 211d of the two catalyst supports face one another and approach approach one another in the direction away from the inlet. At their end surfaces opposite to the inlet 207, the two catalyst supports 211 are connected tightly and firmly to one another, for example welded directly and/or via a connecting member which connects them. In the section shown in FIG. 10, the two catalyst supports together thus form a V. The base surfaces 211a and the top surface 211b of the catalyst supports each rest against one of the two broader longitudinal walls 204b of the housing 203, for example according to FIGS. 11 and 12.

The inner space of the inlet 207 leads into an inner cavity 211 which is present in the housing 203 between the side surfaces 211d of the two catalyst supports 211 and, in the section shown in FIG. 10, becomes narrower along the axis 202 in the direction away from the inlet. At its orifice leading into the inner cavity 221, the inner space of the inlet 207 has an approximately quadrilateral contour and approximately the same contour dimensions as that end of the inner cavity 221 which is located closer to the inlet. Intermediate spaces are present between the longitudinal walls 204a of the housing and those side surfaces 211c of the catalyst support which face said housing, and said intermediate spaces, together with an intermediate space present between the end wall 206 of the housing and the end surfaces 211f of the catalyst support, form an outer cavity 222 which is connected to the inner space of the outlet 208. The outlet 208 is formed, for example, identically to the inlet but could have a circular orifice instead of a quadrilateral orifice leading into the outer cavity 222.

In the production of the catalyst supports 221, it is possible, for example, to produce at least one flat, strip-like sheet metal part—i.e. a metal strip—which serves for the formation of the first sheet metal members and whose edges parallel to one another subsequently are adjacent to the end surfaces 211e or 211f of a catalyst support. That inner region of the metal strip which subsequently serves for the formation of the main section 213a of sheet metal members may be provided with waves running in its longitudinal direction by cold forming in a rolling apparatus having profiled rolls. The edge regions of the metal strip which subsequently form the retaining sections 213e, 213f are left flat and, after forming of the waves, are connected, for example by spot welding, at least at points to steel strips serving for the formation of the spacer members 215. Alumina and catalytically active material are then applied to the two surfaces of the wavy region of the metal strip. On the other hand, the edge regions of the metal strip which subsequently form the retaining sections 213e, 213f and at least the subsequent welded surfaces of the steel strips remain untreated, i.e. uncoated. The coated metal strip can then be cut into first sheet metal members, the cutting lines making the angle alpha with the longitudinal edges of the metal strip. Furthermore, at least one flat, strip-like sheet metal part serving for the formation of second sheet metal members can be produced. The two surfaces of that middle region of this strip-like sheet metal part or metal strip which serves for the formation of the main section 214a of second sheet metal members 214 can then be coated with alumina and catalytically active material, and the metal strip can be cut into two sheet metal members 214 by means of oblique cuts. Finally, the first sheet metal members 213 already connected to spacer members 215 and the second sheet metal members 214 can be assembled to give catalyst supports 211 and connected rigidly to one another by weld joints.

During operation of the catalytic converter 201, the exhaust gas flows through the inlet 207 into the inner cavity 221. The exhaust gas then flows into the passages 217 at those side surfaces 211d of the catalyst supports which serve as exhaust gas entry surfaces and flow through said passages. The exhaust gas emerging from the catalyst supports at the side surfaces 211c serving as exhaust gas exit surfaces then flows through the outer cavity 222 to the outlet.

The catalyst support 301 shown in FIGS. 14 and 15 and forming catalyst means is sleeve-like or annular, encloses an axis and has an outer, cylindrical lateral surface 301a, an inner cylindrical lateral surface 301b and two flat end surfaces 301c. The two lateral surfaces 301a, 301b are, for example, circular in cross-section but could instead be oval or polygonal or have both curved and straight sections.

The catalyst support 301 has a packet or a group of first sheet metal members 303 and second sheet metal members 304 alternating with one another along the axis. Each sheet metal member 303, 304 forms a closed ring. Each first sheet metal member 303 has a main section 303a which is provided with protuberances, namely waves 303b running radially from the inner to the outer edge. The waves 303b have wave summits 303c on their upper side in FIG. 15 and wave summits 303d on their lower side in FIG. 15. The width and the wavelength of the waves measured between two wave summits 303c or 303d adjacent to one another along the circumference increases from the inside to the outside. However, the waves are shown in FIG. 15 as if they had the same width or wavelength everywhere.

Each first sheet metal member 303 has several, for example at least three, flat retaining sections 303e distributed along the circumference. These are arranged, for example, a distance away from both edges of the sheet metal members 303, so that they interrupt some waves. Apart from their transition sections passing over into the flat retaining sections, the waves have the same height everywhere. Each retaining section 303e has a circular hole 303g.

The second sheet metal members 304 are essentially completely flat. The second sheet metal members 304 have a main section 304a resting against the wave summit and retaining sections 304b which coincide in axial projection with retaining sections 303b and have a circular hole 304g.

The main sections 303a and 304a of the sheet metal members 303 and 304, respectively, have an aluminum coating on both surfaces, on which coating catalytically active material is applied. The retaining sections 303e and 304e are, for example, untreated and uncoated.

The catalyst support 301 has retaining means which serve for holding together the sheet metal members 303, 304 and possess spacer members 305, bolts 306 and end members 308. The spacer members 305 consist of an annular disk which has flat end surfaces parallel to one another, a circular contour and a central, circular hole 305g. Its diameter is, for example, equal to the diameter of the holes 303g, 403g or a little larger than this. The spacer members 306 are arranged between first and second sheet metal members in such a way that, at its retaining section 303e, at lease each first sheet metal member 303 not located at an end of the packet formed by the sheet metal members rests with its lower surface in FIG. 15 against retaining sections 304e of an adjacent second sheet metal member 304 and with its upper surface in FIG. 15 against a spacer member 305. The bolts 306 are circular in cross-section and pass through the holes in the sheet metal members 303, 304 and spacer members 305 with at most little radial play, said holes being located one on top of the other in FIG. 15. The end members 308 consist, for example, of flat annular disks which are thicker than the sheet metal members 303, 304 and have edges which are at least approximately flush with the outer and inner edges of the sheet metal members in the axial direction of view. The bolts 306 project into holes 308g in the end members 308 or pass through these and are rigidly connected, for example welded, to the end members in such a way that the end members 308 press the sheet metal members 303, 304 and spacer members 305 against one another and clamp them rigidly against one another. The main sections 303a, 304a of the sheet metal members then rest against one another at the wave summits and together bound radial passages 307.

In the production of the catalyst support 301, it is possible, for example, to produce annular sheet metal parts which serve for the formation of the first and second sheet metal members 303, 304, for example from a metal strip or a metal plate. The metal parts serving for the formation of the first sheet metal members 303 may be provided with waves, for example by deep drawing, and connected to spacer members, possibly by spot welding or the like. Furthermore, the main sections of the first and second sheet metal members are coated with alumina and catalytically active material and then assembled with the spacer members 305, bolts 306 and end members 308 to give a catalyst support 301.

Figure 16:
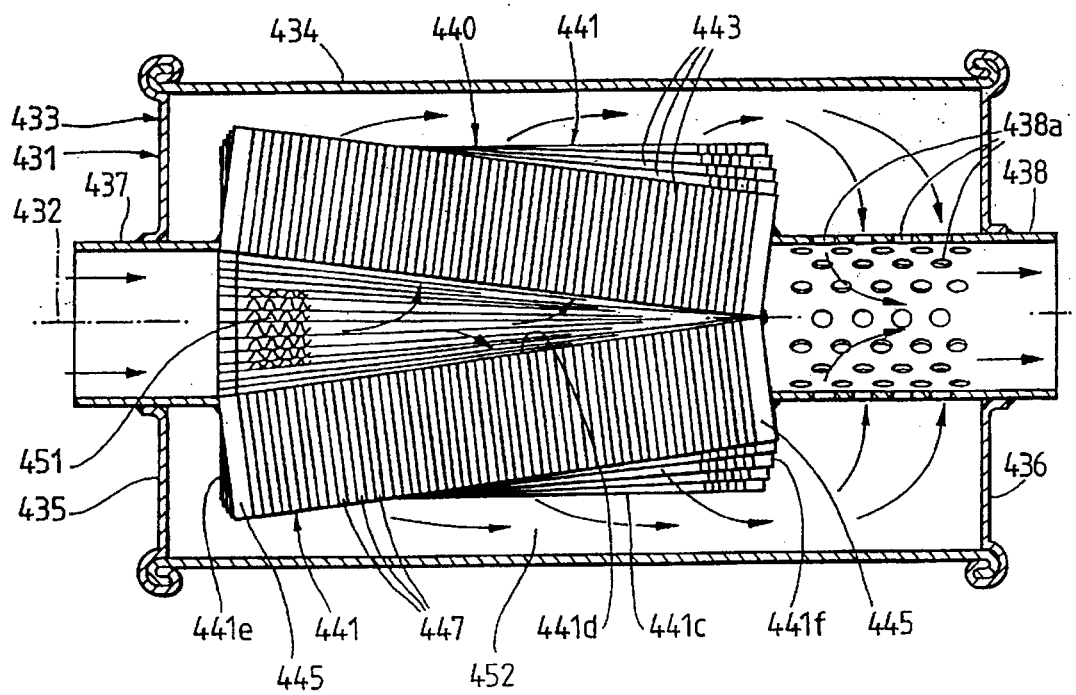
FIG. 16 shows a longitudinal section through a catalytic converter having four packets of sheet metal members.
Figure 18:
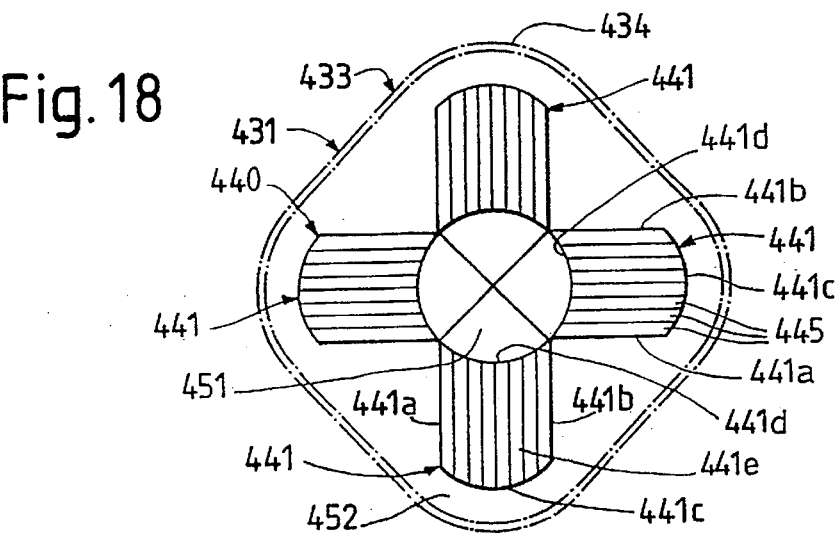
FIG. 18 shows a view of the catalyst means according to FIG. 17 in the direction of view denoted therein by the arrow XVIII, the casing of the housing also being shown.
Figure 19:
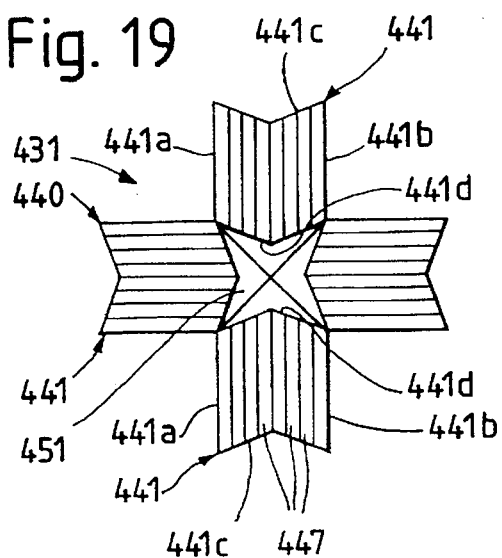
FIG. 19 shows a cross-section through the catalyst means shown in FIGS. 16 to 18.
Figure 20:
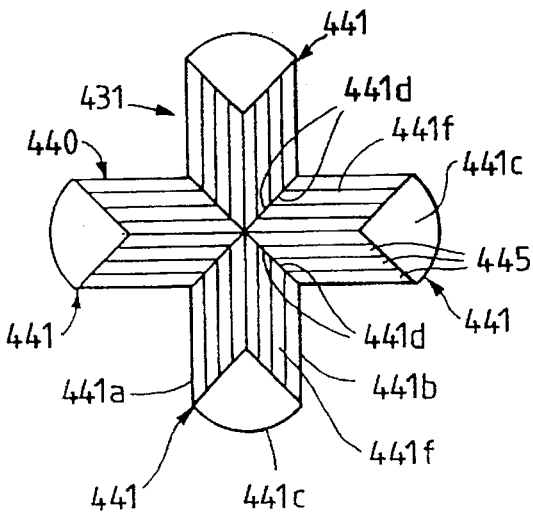
FIG. 20 shows a view of the catalyst means shown in FIGS. 16 to 19, in the direction of view denoted in FIG. 17 by the arrow XX.

The catalytic converter 431 shown schematically in FIG. 16 defines an axis 432 and has a housing 433 with a metallic wall. This has a casing 432 parallel to the axis 432 and end walls 435, 436 arranged at its two ends and firmly and tightly connected thereto by flanges. The casing is also indicated in FIG. 18 and, according to this, has in cross-section, for example, approximately the shape of a square whose corners are replaced by rounded transitions. The two end walls 435, 436 are essentially flat and at right angles to the axis 432 and have a hole in the center. The inlet 437 and the outlet 438 of the catalytic converter 431 each have a socket which consists of a cylindrical pipe section, passes through the hole in the first end wall 435 or in the second end wall 436, projects into the inner space enclosed by the wall of the housing and is connected rigidly and tightly, namely welded, to the relevant end wall. That segment of the socket or pipe section belonging to the outlet 438 which is located in the stated inner space is provided with holes 438a distributed over this casing.

The catalytic converter 431 has catalyst means 440 which are arranged in the housing, are also shown in FIGS. 17 to 20 and have four catalyst supports 441 which are distributed around the axis 432 and together for a cross. Each of these has two flat side surfaces 441a or 441b parallel to one another and to the axis 432, an outer surface 441c and an inner surface 441d with two end surfaces 441e and 441f. The four inner surfaces 441d together form a surface completely enclosing the axis. On the other hand, the outer surfaces 441c of the four catalyst supports 441 are a distance apart. Those edges of the inner surfaces 441d which abut the end surfaces 441e and are shown in FIG. 16 and 18 together form a closed line, namely essentially a circle. The outer surfaces 441c and inner surfaces 441d consist of ruled surfaces and, in every catalyst support 441, are straight and parallel to one another in all sections parallel to its side surfaces 441a, 441b. The longitudinal edges of the four outer surfaces 441c and of the four inner surfaces 441d are furthermore parallel to the axis 432 and are adjacent to one another in pairs. The remaining, middle cross-sectional regions of the outer and inner surfaces are inclined away from the end surfaces 441e towards the axis in such a way that the inner surface 441d of each catalyst support 441 has, at its end surface 441f, a V-shaped edge which rests against the edge of an adjacent inner surface 441d in the case of each V limb. At their edges abutting the end surfaces 441f, the four inner surfaces 441d accordingly converge to two intersecting straight lines.

Figure 17:
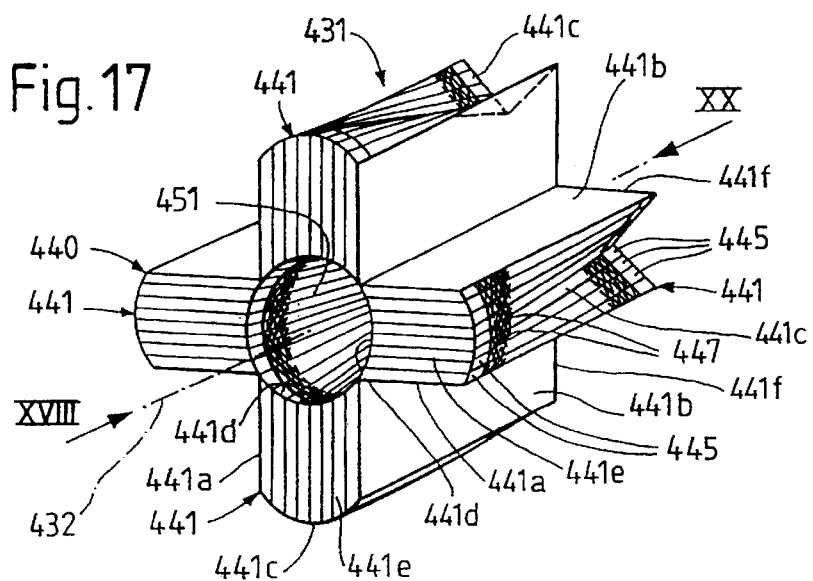
FIG. 17 shows a simplified oblique view of catalyst means of the catalytic converter drawn in FIG. 16.

Each catalyst support 441 has a packet of alternating first and second sheet metal members. The first sheet metal members 443 have waves, some of which are indicated in FIGS. 16 and 17. Each first sheet metal member 443 defines two flat osculating surfaces which mold to its wave summits. The second sheet metal members are once again essentially flat. In a projection at right angles to the flat osculating surfaces of the first sheet metal members 443 and to the surfaces and osculating surfaces of the second sheet metal members, the sheet metal members are rectangular so that particularly the two longer edges of each sheet metal member are straight and parallel to one another. The waves of each first sheet metal member 443 are straight, parallel to one another at right angles to the longitudinal edges of the relevant sheet metal member. The sheet metal members belonging to the same catalyst support 441 are rigidly connected to one another by retaining means in such a way that the second, flat sheet metal members rest against the wave summits of the first sheet metal menders 443. The retaining means may have, for example, strip-like or bar-like spacer members 445 which, similarly to the spacer members 215 of the catalyst support shown in FIG. 13, are arranged at the shorter edges of the sheet metal members and are at least approximately parallel to waves of the first sheet metal member 443 resting against them. However, the sheet metal members belonging to the same catalyst support are rotated relative to one another in such a way that their longitudinal edges together form the outer surface 441c and inner surface 441d, each of which consists of a curved ruled surface. The sheet metal members belonging to one and the same catalyst support 441 are welded at their shorter edges to one another and to the spacer members 445. The end surfaces 441e, 441f may consist of curved ruled surfaces which result when the rectangular sheet metal members are rotated. However, the end surfaces 441e are shown as planes in FIG. 17 for the sake of simplicity. However, the end surfaces 441e and/or 441f could be machined to make them flat and at right angles to the axis 432. The four catalyst supports 441 are rigidly and tightly connected, namely welded, to one another at the longitudinal edges of their inner surfaces 441d and at those edges of the inner surfaces 441d which are located in the end surfaces 441f. If necessary, struts or the like which are not shown and which additionally connect the various catalyst supports to one another may also be present. Each catalyst support 441 has a group of straight passages 447 which run from the inner surface 441c to the outer surface 441d. All passages 447 belonging to the same catalyst support 441 are parallel to one and the same plane passing through the axis 432 and through the middle of the catalyst support and to the side surfaces 441a, 441b. The passages 447 are furthermore at right angles to longitudinal edges of the first sheet metal members bounding them. The passages 447 belonging to the same catalyst support 441 thus have different directions which are dependent on the distance from the plane passing through the axis 432 and through the middle of the catalyst support 441. It should also be noted that, in comparison with its outer dimensions, each catalyst support 441 actually has many more sheet metal members than are shown in FIGS. 16 to 20.

The catalyst means 440 are connected, at the end surfaces 441e, 441f, rigidly to those ends of the sockets which are located in the inner space of the housing 443 and form the inlet 437 and the outlet 438. The catalyst means 440 are a distance away from the wall of the housing 433 all around. The socket forming the inlet 437 leads, at its end connected tightly to the four catalyst supports 441, into the inner cavity 451 enclosed by the inner surfaces 441d. In accordance with the arrangement of the catalyst supports, the passages 447 belonging to the four catalyst supports 441 run away from the inner cavity 451 on four different sides of the inner cavity 451, distributed uniformly around the axis 432. The internal diameter of the inlet 437 and in particular of its end connected to the catalyst means 440 is approximately, and preferably exactly, equal to the diameter of the circle formed by those edges of the inner surfaces 441d which lie in the end surface 441e, so that the inner cavity 451 connects continuously with the inner space of the inlet. The inner cavity 451 is completely free, i.e. contains no bounding member corresponding to the bounding members 250, 380, 420, and has a cross-sectional area which decreases linearly along the axis 432 in a direction away from the inlet. An outer cavity 452 which is connected by the holes 438a of the socket of the outlet 438 to its inner space is present between the casing 434 and the surfaces 441a, 441b, 441c of the catalyst supports 441.

The catalytic converter 431 can be installed in an exhaust system of an internal combustion engine. During its operation, exhaust gas indicated by arrows in FIG. 16 then flows through the inlet 437 into the inner cavity 451. The exhaust gas is deflected therein and distributed over the passages 447 and then flows through the passages 447, whereupon it is catalytically treated. The exhaust gas then passes into the outer cavity 452 and flows therein to the outlet 438, it also being possible for some of the exhaust gas to flow between the side surfaces 441a, 441b of adjacent catalyst supports 441. The exhaust gas then flows through the holes 438a into the inner space of the outlet 438 and leaves the inner space of the housing 443 through said outlet.

Figure 21:
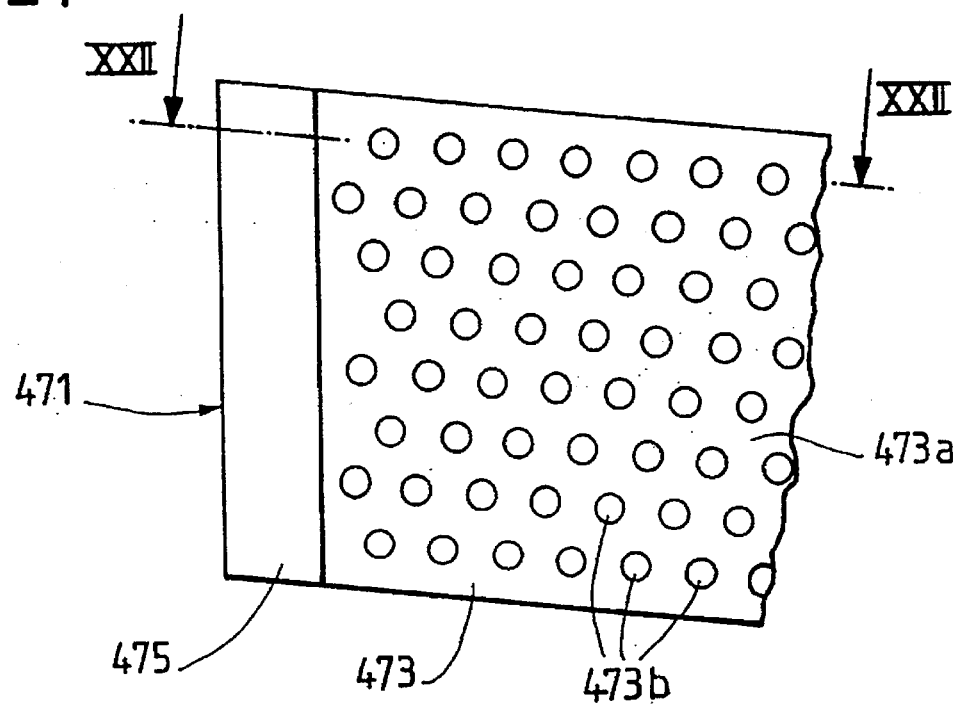
FIG. 21 shows a view of catalyst means with quadrilateral sheet metal members having bulges and FIG. 22 shows a section along the line XXII in FIG. 21 on a larger scale.
Figure 22:
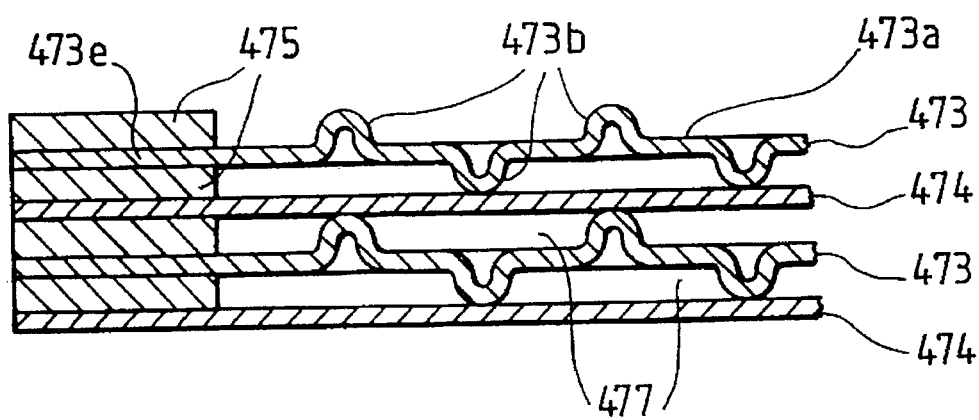

The catalyst support 471 shown partly in FIG. 21 and 22 may have, for example, a contour similar to the catalyst support 211 shown in FIG. 10 to 13 and may therefore form a prism whose base surface consists of an oblique-angled parallelogram. The catalyst support 471 has a packet of alternating first sheet metal members 473 and second sheet metal meanders 474 which, in plan view, have the same contour as the base surface of the prism. Each first sheet metal member 473 has a main section 473a with protuberances which consist of bulges 473b which are distributed uniformly above the main section 473a and at least most of which are a distance away from the edges of the sheet metal member 473 and are bounded by closed, for example circular, contour lines. In the section shown in FIG. 21, bulges 473b pointing upward and downward alternate with one another. Each first sheet metal member 473 thus has bulges 473b which project in opposite directions from a central plane of the first sheet metal member and from those regions of the first sheet metal member which are located between adjacent bulges. Each first sheet metal member 473e furthermore has, for example, two flat retaining sections 473c arranged at two edges opposite to one another. The second sheet metal members 474 are essentially flat. The sheet metal members 473, 474 are held together by retaining means. These have two rows of spacer members 475, only one of these rows being shown in FIGS. 21 and 22. For example, a spacer member is arranged between successive retaining sections of sheet metal members. The sheet metal members and spacer members are welded to one another. The catalyst support 471 has passages which run between the two rows of spacer members.

Two catalyst supports 471 formed according to FIG. 21 and 22 can be arranged analogously to the catalyst supposes 211 in a housing of a catalytic converter in such a way that together they form V-shaped catalyst means. However, in the case of all other catalyst supports shown in FIGS. 1 to 20, there is also the possibility of providing the first sheet metal members with bulges corresponding to the bulges 473b instead of with waves.

As already mentioned after the Figure captions, various figures are not drawn to scale. In this context, it should be noted in particular that the spacer members 5, 15, 65, 135, 145, 155, 215, 445, 475 actually preferably form, a cross-section, a narrow rectangle whose longer sides are parallel to the surface sections of the sheet metal members against which the spacer members rest. In the case of the catalyst supports whose first sheet metal members have waves with a height which is constant or varies along the waves, the cross-sectional dimension, i.e. thickness, of the spacer members measured at right angles to those surfaces of the spacer members which rest against sheet metal members is for example, about 0.3 mm to 1 mm, as in the case of the wave height. The cross-sectional dimension, i.e. width, of the spacer members measured parallel to the surface sections of the retaining sections of sheet metal members is then preferably at least 5 times and, for example, about 10 times greater than the thickness of the spacer members.

The catalyst supports and catalytic converters may also be modified in other ways.

Firstly, features of different embodiments already described can be combined with one another. For example, the sheet metal members and retaining means in the catalyst supports 61, 131, 151 could be modified analogously to the manner described for the catalyst support 1 shown in FIG. 4.

In the case of the catalyst supports 211 shown in FIGS. 10 to 13, the upper and/or the lower limitation of the two catalyst supports 111d or packets of sheet metal members could be formed by first sheet metal members having waves instead of by second, flat sheet metal members.

The base surfaces and top surfaces of the catalyst supports 211 shown in FIGS. 10 to 13 could consist not of oblique-angled parallelograms but of parallelograms having sides at right angles to one another—i.e. rectangles or squares—or of quadrilaterals having only two or even no sides or edges parallel to one another. If the catalyst supports 211 and their sheet metal members are made rectangular or square, the sheet metal members could furthermore consist of sections of continuous strips, analogously to FIG. 4. The arrangement of the catalyst supports in the housing and the production process would then have to be adapted accordingly.

In the case of the catalyst means described with reference to FIGS. 9 to 13, the osculating planes defined by the sheet metal members and molding to their surfaces and also the flat sheet metal members themselves are parallel to the axis of the catalytic converters and catalyst means. However, the sheet metal members 153, 154 of the catalyst supports 151 shown in FIG. 9 could be replaced by sheet metal members whose osculating planes are at right angles to the axis of the catalyst means and which form a right angled parallelogram in a projection at right angles to the osculating planes—i.e. in axial view. The catalyst supports then have flat outer and inner surfaces instead of the curved outer surfaces 151a and curved inner surfaces 151b shown in FIG. 9. The flat inner surfaces which together enclose an inner cavity then together form a polygon in cross-section. The waves and passages then run outwards away from the inner cavity, as in FIG. 9. In the case of the catalyst supports arranged in a V shape according to FIGS. 10 to 12, the sheet metal members may be arranged in such a way that the osculating planes defined by the sheet metal members are at right angles to the walls 204b of the housing and either at right angles to the axis 202 or at right angles to the inner surfaces 211d and outer surfaces 211c and thus in both cases make a fairly large angle with the axis 202. The waves may then run parallel to the walls 204b from the inner cavity 221 to the outer cavity 222, as is the case of the catalyst supports shown.

Furthermore, the weld joints in various catalyst supports described with reference to FIGS. 1 to 13 and 16 to 22 could be completely or partly replaced by hard solder joints or possibly clamping connections. Conversely, the sheet metal members in the catalyst support described with reference to FIGS. 14 and 15 could be connected by weld joints and/or hard solder joints to members of the holding means.

Instead of having four catalyst supports 441, the catalyst means 440 shown in FIGS. 16 to 20 could have only two or three or more than four catalyst supports, each having a packet of sheet metal members.

What is claimed is:

1. Catalyst means for catalytic treatment of an exhaust gas, comprising at least one packet of alternating first and second sheet metal members; and a plurality of spacer members arranged between adjacent respective first and second sheet metal members, wherein each of the first and second sheet metal members has two opposite edges, wherein each second sheet metal member has two opposite sections defining said two edges of the second sheet metal member and having each a straight cross-section along a line crossing said two edges, and each first sheet metal member has an intermediate main section provided with protuberances and two retaining sections provided on opposite sides of said intermediate main section, located adjacent to said two opposite edges of the first sheet metal member, respectively, and having each a straight cross-section along a line crossing said two edges, wherein each spacer member extends between a respective retaining section of a respective first sheet metal member and a respective second sheet metal member substantially along respective edges of said respective first and second sheet metal members, wherein each of first and second sheet metal members, which are located between opposite end sheet metal members of said at least one packet, has a first surface section resting against a respective spacer member and a second surface section, remote from the respective spacer member and resting against one of a respective one of the first and second sheet metal members and another spacer member, wherein first and second sheet metal members and spacer members resting against each other are fixedly connected with each other, and wherein respective first and second sheet metal members define pairwise respective exhaust gas passages.

2. Catalyst means according to claim 1, wherein the sheet metal members and spacer members are connected to one another by weld joints.

3. Catalyst means according to claim 1, wherein the protuberances of each first sheet metal member contact at least one adjacent second sheet metal member.

4. Catalyst means according to claim 1, wherein each sheet metal member is in the form of a parallelogram in plan view.

5. Catalyst means according to claim 1, wherein each sheet metal member consists of a separate part.

6. Catalyst means according to claim 1, wherein an inner cavity is present between different groups of sheet metal members, wherein the sheet metal members have, in addition to said two edges opposite to one another, inner edges defining an inner cavity, and wherein said passages extend outward from said inner cavity.

7. Catalyst means according to claim 6, wherein the inner edges of the sheet metal members together form an inner surface which completely encloses the inner cavity in cross-section.

8. Catalyst means according to claim 1, wherein at least one group of successive sheet metal members is present, which sheet metal members define osculating planes which mold to the sheet metal members and are parallel to one another.

9. Catalyst means according to claim 8, where at least one packet of sheet metal members is present, which packet has a shape of a prism which has a base surface in the form of a parallelogram and a top surface in the form of a parallelogram.

10. Catalyst means according to claim 1, wherein those surface sections of the sheet metal members which bound the passages are provided with a coating which contains catalytically active material.

11. Catalyst means according to claim 10, wherein those surface sections of the sheet metal members which rest against the spacer members have no coating.

12. Catalyst means according to claim 1, wherein the second surface section rests against one of the respective first and second sheet metal members, and wherein each retaining section resting against a respective second sheet metal member is fixedly connected thereto.

13. Catalyst means according to claim 1, wherein the protuberances are formed by waves extending substantially along the edges of the first sheet metal members.

14. Catalyst means according to claim 1, wherein the spacer members extend along an entire length of said edges.

15. Catalyst means according to claim 1, wherein each second sheet metal member and each retaining section of each first sheet metal member is flat.

16. Catalyst means according to claim 1, wherein each sheet metal member has two other edges which, in a plan view, are straight and extend parallel to one another.

17. Catalyst means according to claim 1, wherein said two edges of each sheet metal member extend opposite to one another, are straight and parallel to one another, and wherein several successive sheet metal members are contiguous at one of said two edges and are formed by sections of a one-piece, strip-shaped part.

18. Catalyst means according to claim 1, wherein the retaining sections of the first sheet metal members and the second sheet metal members are substantially flat.

19. Catalyst means for catalytic treatment of an exhaust gas, comprising at least one packet of alternating first and second sheet metal members; and a plurality of spacer members arranged between adjacent respective first and second sheet metal members, wherein each of said first and second sheet metal members is quadrilateral in a plan view and has first opposite edges and second opposite edges, wherein each second sheet metal member has a straight cross-section along a line forming an angle with each of the first opposite edges of the second sheet metal member, and each first sheet metal member has an intermediate main section provided with waves and two retaining sections provided on opposite sides of said intermediate main section, located adjacent to said two first opposite edges, respectively, and having each a straight cross-section along a line forming an angle with each of the opposite first edges of said first sheet metal member, wherein each spacer member extends between a respective retaining section of a respective first sheet metal member and a respective second sheet metal member substantially along respective first edges of said respective first and second sheet metal members, wherein each of first and second sheet metal members, which are located between opposite end sheet metal members of said at least one packet, has first surface section resting against a respective spacer member and a second surface section, remote from the respective spacer member and resting against one of a respective one of the first and second sheet metal members and a respective another spacer member, wherein first and second sheet metal members and spacer members resting against each other are connected with each other by welding, wherein respective first and second sheet metal members define pairwise respective exhaust gas passages, and wherein the waves and exhaust gas passages extend from ones of the second opposite edges to respective another second opposite edges.

20. Catalyst means according to claim 19, wherein each spacer member extends along an entire length of the respective first edges.

21. Catalyst means according to claim 19, wherein said second opposite edges comprise inner edges defining an inner cavity, and wherein the exhaust gas passages extend outwardly from said inner cavity.

22. Catalyst means according to claim 19, wherein the second surface section rests against one of the respective first and second sheet metal members, and wherein each retaining section resting against a respective second sheet metal member is connected thereto by welding.

23. Catalyst means according to claim 19, wherein the retaining sections of the first sheet metal members and the second sheet metal members are substantially flat.

24. Catalyst means for catalytic treatment of an exhaust gas, comprising at least one packet of alternating first and second sheet metal members; and a plurality of spacer members arranged between adjacent respective first and second sheet metal members, wherein each of said first and second sheet metal members is quadrilateral in a plan view and has first opposite edges and second opposite edges, wherein said at least one packet has substantially a shape of a prism with opposite base and top surfaces having a shape of a parallelogram, wherein each second sheet metal member is substantially flat, and each first sheet metal member has an intermediate main section provided with waves and two substantially flat retaining sections provided on opposite sides of said intermediate main section and located adjacent to said two first opposite edges, respectively, of a respective first sheet metal member, wherein each spacer member extends between a respective retaining section of a respective first sheet metal member and a respective second sheet metal member substantially along respective first edges of said respective first and second sheet metal members, wherein each of first and second sheet metal members, which are located between opposite end sheet metal members of said at least one packet, has a first surface section resting against a respective spacer member and a second surface section, remote from the respective spacer member and resting against one of a respective one of the first and second sheet metal members and a respective another spacer member, wherein first and second sheet metal members and spacer members resting against each other are connected with each other by welding, and wherein respective first and second sheet metal members define pairwise respective exhaust gas passages.

25. Catalyst means according to claim 24, wherein the waves of the main section of each first sheet metal member located between end sheet metal members of said at least one packet contact adjacent second sheet metal members.

26. Catalyst means according to claim 24, wherein the second surface section rests against a respective one of the first and second sheet metal members, and wherein each retaining section resting against a respective second sheet metal member is connected thereto by welding.

27. Catalyst means for catalytic treatment of an exhaust gas, comprising a plurality of packets with each packet having a plurality of alternating first and second sheet metal members; and a plurality of spacer members arranged between adjacent respective first and second sheet metal members, wherein each of said first and second sheet metal members is quadrilateral in plan view and has first opposite edges and second opposite edges, wherein each second sheet metal member is substantially flat, and each first sheet metal member has an intermediate main section provided with waves and two substantially flat retaining sections provided on opposite sides of said intermediate main section and located adjacent to said two first opposite edges, respectively, of a respective first sheet metal member, wherein each spacer member extends between a respective retaining section of a respective first sheet metal member and a respective second sheet metal member substantially along respective first edges of said respective first and second sheet metal members, wherein each of first and second sheet metal members, which are located between opposite end sheet metal members of one packet, has a first surface section resting against a respective space member and a second surface section, remote from the respective spacer member and resting against one of a respective one of the first and second sheet metal members and a respective another spacer member, wherein first and second sheet metal members and spacer members resting against each other are connected with each other by welding, wherein respective first and second sheet metal members define pairwise respective exhaust gas passages extending from ones of second opposite edges to respective another of second opposite edges, wherein the second sheet metal members of a same packet have opposite surfaces which are all parallel to one another, wherein second opposite edges of the first and second sheet metal members of the plurality of packets comprise respective inner edges defining an inner cavity, and wherein the first and second metal members of each packet are so arranged relative to each other that a cross-sectional area of said inner cavity decreases along said respective inner edges.

28. Catalyst means according to claim 27, wherein said inner cavity has a first, wide end having a circular cross-section, and a second opposite end, and wherein said inner edges define surfaces converging into lines at said second end.

29. Catalyst means according to claim 27, wherein said second surface section rests against the respective one of said first and second sheet metal members, and wherein each retaining section resting against a respective second sheet metal member is connected thereto by welding.

30. Catalyst means for catalytic treatment of an exhaust gas, comprising at least one packet of alternating first and second sheet metal members; retaining means including a plurality of spacer members arranged between adjacent respective first and second sheet metal members; two end members provided at opposite ends of said at least one packet; and connecting bolts, wherein each of the first sheet metal members has at least one section provided with waves and a flat retaining section having a hole for receiving a connecting bolt, wherein each of the second sheet metal members is flat and likewise has a hole for receiving a connecting bolt, wherein each spacer member is located between the retaining section of a respective first sheet metal member and a respective second sheet metal member, wherein each of the first and second sheet metal members located between opposite end sheet metal members has a first surface section resting against a respective spacer member and a second surface section, remote from the respective spacer member, resting against one of a respective one of the first and second sheet metal members and a respective another spacer member, and wherein each of the connecting bolts is rigidly connected with said end members so that said end members clamp the first and second sheet metal members and spacer members against each other.

31. Catalyst means according to claim 30, wherein said second surface section rests against a respective one of the first and second sheet metal members.

32. Catalyst means for catalytic treatment of an exhaust gas, comprising a closed packet of alternating first and second sheet metal members; and a plurality of spacer members arranged between adjacent respective first and second sheet metal members, wherein the first and second sheet metal members encompass an inner cavity in cross-section, wherein each of the first and second sheet metal members has two opposite first edges and two opposite second edges, wherein the first edges run away from the inner cavity and wherein the second edges comprise inner edges defining the inner cavity, wherein each second sheet metal member has a straight cross-section along a line forming an angle with each of the first opposite edges of the second sheet metal member, and each first sheet metal member has an intermediate main section provided with protuberances and two retaining sections provided on opposite sides of said intermediate main section, located adjacent to said two opposite first edges, respectively, and having each a straight cross-section along a line forming an angle with each of said first edges of a respective first sheet metal member, wherein each spacer member extends between a retaining section of a first sheet metal member and a respective second sheet metal member substantially along first edges of said first and second sheet metal members, wherein each of first and second sheet metal member has a first surface section resting against a spacer member and a second surface section, remote from the respective spacer member and resting against one of the first and second sheet metal members and another spacer member, wherein first and second sheet metal members and spacer members resting against each other are fixedly connected with each other, and wherein adjacent first and second sheet metal members define pairwise exhaust gas passages running away from the inner cavity.

33. Catalyst means according to claim 32, wherein the protuberances consist of waves running away from the inner edges.

34. Catalyst means according to claim 32, wherein each second surface section rests against an adjacent sheet metal member, and wherein each retaining section resting against a second sheet metal member is fixedly connected thereto.

35. Catalyst means according to claim 32, wherein the adjacent sheet metal members and spacer members are fixedly connected with each other by welding.

36. Catalyst means according to claim 32, wherein the sheet metal members have surface sections adjacent to the exhaust gas passages which are provided with a coating which contains catalytically active material.

37. Catalyst means according to claim 32, wherein said inner edges of the first and second sheet metal members define an inner surface encompassing said inner cavity, wherein said inner surface is at least partly curved in cross-section, wherein the second sheet metal members are flat and have straight, inner edges parallel to one another, wherein the waves of each first sheet metal member contact two respective second sheet metal members disposed on opposite sides of a respective first sheet metal member, and wherein protuberances of the first sheet metal members abutting a curved section of the inner surface have heights increasing in a direction away from the inner cavity.

38. Catalyst means for catalytic treatment of an exhaust gas, comprising a closed packet of alternating first and second sheet metal members; and a plurality of spacer members arranged between adjacent respective first and second sheet metal members, wherein the first and second sheet metal members encompass an inner cavity in cross-section, wherein each of said first and second sheet metal members is quadrilateral in a plan view and has first opposite edges and second opposite edges, wherein each second sheet metal member has two opposite sections defining said first edges of the second sheet metal member and having each a straight cross-section along a line crossing said two first opposite edges and extending parallel to an axis of the catalyst means, and each first sheet metal member has an intermediate main section provided with waves and two retaining sections provided on opposite sides of said intermediate main section, located adjacent to said two first opposite edges of first sheet metal member, respectively, and having each a straight cross-section along a line crossing said first opposite edges;

wherein each spacer member extends between a retaining section of a first sheet metal member and an adjacent second sheet metal member substantially along first edges of said first and second sheet metal members, wherein each of first and second sheet metal members has a first surface section resting against a respective spacer member and a second surface section, remote from the respective spacer member and resting against a respective one of the first and second sheet metal members, wherein first and second sheet metal members and spacer members resting against each other are connected with each other by welding, wherein adjacent first and second sheet metal members define pairwise exhaust gas passages, and wherein the waves and exhaust gas passages run away from the inner cavity.

39. Catalyst means according to claim 38, wherein the sheet metal members have surface sections adjacent to the exhaust gas passages which are provided with a coating which contains catalytically active material.

40. Catalyst means according to claim 38, wherein the waves of each first sheet metal member contact two second sheet metal members disposed on opposite sides of a respective first sheet metal member, wherein the packet encompasses an axis extending through the inner cavity, and wherein the sheet metal members are, at least partly, curved in a cross-section at right angles to the axis in such a way that the heights of the waves are essentially constant from inside to outside in all first sheet metal members.

* * * * *